(12) United States Patent
Zhang et al.

(10) Patent No.: US 11,882,528 B2
(45) Date of Patent: *Jan. 23, 2024

(54) METHOD AND APPARATUS FOR UPLINK TRANSMISSION IN A WIRELESS COMMUNICATION SYSTEM

(71) Applicant: Samsung Electronics Co., Ltd., Gyeonggi-do (KR)

(72) Inventors: Sa Zhang, Gyeonggi-do (KR); Yi Wang, Gyeonggi-do (KR); Jingxing Fu, Gyeonggi-do (KR); Feifei Sun, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 18/096,285

(22) Filed: Jan. 12, 2023

(65) Prior Publication Data

US 2023/0156623 A1 May 18, 2023

Related U.S. Application Data

(63) Continuation of application No. 17/392,789, filed on Aug. 3, 2021, now Pat. No. 11,558,825.

(30) Foreign Application Priority Data

Aug. 3, 2020 (CN) .......................... 202010768045.9
Aug. 3, 2020 (CN) .......................... 202010769058.8
(Continued)

(51) Int. Cl.
*H04W 52/34* (2009.01)
*H04W 52/14* (2009.01)
*H04W 72/21* (2023.01)

(52) U.S. Cl.
CPC ......... *H04W 52/34* (2013.01); *H04W 52/146* (2013.01); *H04W 72/21* (2023.01)

(58) Field of Classification Search
CPC ... H04W 52/34; H04W 72/21; H04W 52/146; H04W 52/346; H04W 72/0413
See application file for complete search history.

(56) References Cited

U.S. PATENT DOCUMENTS

2011/0103290 A1\* 5/2011 Suzuki .................. H04W 72/12
370/312
2019/0103947 A1\* 4/2019 Park ...................... H04L 1/1861
(Continued)

FOREIGN PATENT DOCUMENTS

EP           2 797 253          10/2014
WO    WO 2020/033237         2/2020
WO    WO 2020/145610         7/2020

OTHER PUBLICATIONS

ZTE, "Remaining Issues on Scheduling/HARQ Enhancements for NR URLLC", R1-2003320, 3GPP TSG RAN WG1 #101, May 25-Jun. 5, 2020, 2 pages.
(Continued)

*Primary Examiner* — John J Lee
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure relates to mobile commu-
(Continued)

nication technology, and in particular, to a method for uplink transmission and apparatus thereof.

20 Claims, 4 Drawing Sheets

(30) Foreign Application Priority Data

Aug. 3, 2020 (CN) .......................... 202010769061.X
May 7, 2021 (CN) .......................... 202110495563.2

(56) References Cited

U.S. PATENT DOCUMENTS

2020/0100276 A1* 3/2020 Oh .................... H04W 16/14
2020/0145167 A1   5/2020 Jung et al.
2022/0086032 A1   3/2022 Park

OTHER PUBLICATIONS

International Search Report dated Oct. 29, 2021 issued in counterpart application No. PCT/KR2021/010151, 6 pages.
European Search Report dated Dec. 5, 2023 issued in counterpart application No. 21852863.6-1206, 8 pages.

* cited by examiner

METHOD AND APPARATUS FOR UPLINK TRANSMISSION IN A WIRELESS COMMUNICATION SYSTEM

CROSS-REFERENCE TO RELATED APPLICATION(S)

This application is a Continuation of U.S. patent application Ser. No. 17/392,789, filed with the U.S. Patent and Trademark Office on Aug. 3, 2021, and is based on and claims priority under 35 U.S.C. § 119 to Chinese Patent Application Nos. 202010768045.9, filed on Aug. 3, 2020, 202010769058.8, filed on Aug. 3, 2020, 202010769061.X, filed on Aug. 3, 2020, and 202110495563.2, filed on May 7, 2021, in the China National Intellectual Property Administration, the disclosure of each of which is incorporated herein by reference in its entirety.

BACKGROUND

1. Field

The present disclosure relates to mobile communication technology, and in particular, to a method for uplink transmission and apparatus thereof.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

With the rapid development of information industry, especially the increasing demand from mobile Internet and IoT, it brings unprecedented challenges to the future mobile communication technology. According to the report of International Telecommunication Union (ITU) ITU-R M. [IMT-.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network. In order to meet the unprecedented challenges, the communication industry and academia have carried out extensive research on the fifth generation (5G) mobile communication technology to face the 2020s. At present in ITU report ITU-R M. [IMT.VISION], the framework and overall goals of the future 5G has been discussed, in which the demand outlook, application scenarios and important performance indicators of 5G are described in detail. With respect to new requirements in 5G, ITU report ITU-R M. [IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3GPP (3rd Generation Partnership Project), the first stage of 5G is already in progress. To support more flexible scheduling, the 3GPP decides to support variable hybrid automatic repeat request-acknowledgement (HARQ-ACK) feedback delay in 5G. In existing long term evolution (LTE) systems, a time from reception of downlink data to uplink transmission of HARQ-ACK is fixed. For example, in frequency division duplex (FDD) systems, the delay is 4 subframes. In time division duplex (TDD) systems, a HARQ-ACK feedback delay is determined for a corresponding downlink subframe according to an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined according to factors such as different services or user capabilities.

SUMMARY

The present disclosure is provided to resolve at least the above problems, and at least the following advantages are provided.

In an embodiment, a method performed by a terminal in a wireless communication system is provided. The method includes receiving, from a base station, at least one of a first type of data or a first type of control signaling; determining a second type of control signaling and a time unit used for transmitting the second type of control signaling based on the at least one of first type of data or the first type of control signaling; and transmitting, to the base station, the second type of control signaling in the determined time unit.

In an embodiment, a method performed by a base station in a wireless communication system is provided. The method includes transmitting, to a terminal, at least one of a first type of data or a first type of control signaling; and receiving, from the terminal, a second type of control signaling in a time unit. The second type of control signaling and the time unit are based on the at least one of the first type of data or the first type of control signaling.

In an embodiment, a terminal in a wireless communication system is provided. The terminal includes a transceiver and a controller. the controller is configured to receive, from a base station via the transceiver, at least one of a first type of data or a first type of control signaling, determine a second type of control signaling and a time unit used for transmitting the second type of control signaling based on the at least one of first type of data or the first type of control signaling, and transmit, to the base station via the transceiver, the second type of control signaling in the determined time unit.

In an embodiment, a base station in a wireless communication system is provided. The base station includes a transceiver and a controller. The controller is configured to transmit, to a terminal via the transceiver, at least one of a first type of data or a first type of control signaling, and receive, from the terminal via the transceiver, a second type of control signaling in a time unit. The second type of control signaling and the time unit are based on the at least one of the first type of data or the first type of control signaling.

According to an aspect of the present disclosure, a method performed by a second type of transceiving node in a wireless communication system is provided. The method includes receiving a first type of data and/or a first type of control signaling from a first type of transceiving node; determining a hybrid automatic repeat request-acknowledgement (HARQ-ACK) codebook and a time unit for transmitting the HARQ-ACK codebook based on the first type of data and/or the first type of control signaling; and transmitting the HARQ-ACK codebook to the first type of transceiving node through a second type of physical channel at the determined time unit, wherein in the case where the second type of transceiving node is configured with two levels of priorities, when the HARQ-ACK codebooks with different priorities are multiplexed in the same second type of physical channel for transmission, determining the HARQ-ACK codebook according to an indication information of the HARQ-ACK codebook whose priority is different from the priority of the data scheduled by the first type of control signaling, which is indicated by a first type of control signaling.

The first type of control signaling may be a downlink control information (DCI), wherein indicating the indication information of the HARQ-ACK codebook whose priority is different from the priority of the data scheduled by the DCI format by reusing one or more fields in the DCI format, and/or one or more bits, or adding one or more fields in the DCI format, and/or adding one or more bits.

For different priorities, the method includes determining the HARQ-ACK codebook with the priority according to the indication information of the HARQ-ACK with the priority indicated by the last DCI format.

When the number of HARQ-ACK sub-codebooks included in a HARQ-ACK codebook with a certain priority is greater than or equal to 1, for each HARQ-ACK sub-codebook, the method includes determining the HARQ-ACK sub-codebook with the priority according to the HARQ indication information of the HARQ-ACK sub-codebook with the priority indicated by the last DCI format.

When the number of physical downlink shared channel (PDSCH) groups of a certain priority is greater than or equal to 1, for each PDSCH group of the priority, the method includes determining the HARQ-ACK codebook of the PDSCH group of the priority according to the HARQ-ACK indication information of the PDSCH group of the priority indicated by the last DCI format, respectively.

The conditions for multiplexing HARQ-ACK codebooks with different priorities in the same second type of physical channel for transmission may be at least one of: when the time unit of the second type of physical channel carrying the HARQ-ACK codebook with a higher priority index overlaps with the time unit of the second type of physical channel carrying the HARQ-ACK codebook with a lower priority index in the time domain; when the parameter configuration for configuring of the HARQ-ACK codebook type of the HARQ-ACK codebook with a lower priority index and/or the parameter configuration for configuring of the HARQ-ACK codebook type of the HARQ-ACK codebook with a higher priority index satisfies certain configuration conditions.

When the bit width of the specific configuration parameter field of the specific DCI format related to the HARQ-ACK with different priorities is different, the method includes inserting "0" into one or more most significant bits (MSBs) of the specific configuration parameter field with a smaller bit width, until it is the same as the bit width of the specific configuration parameter field of the specific DCI format related to the HARQ-ACK with different priorities.

The specific configuration parameter may be the PDSCH group number of the specific DCI format.

The specific configuration parameter may be a new feedback indicator of the specific DCI format.

The specific configuration parameter may be the number of PDSCH groups triggered by the specific DCI format.

According to an aspect of the present disclosure, a second type of transceiving node in a wireless communication system is provided, and includes a transceiver configured to receive a first type of data and/or a first type of control signaling from a first type of transceiving node, and transmit a HARQ-ACK codebook to the first type of transceiving node through a second type of physical channel at a time unit; a controller configured to control an overall operation of the second type of transceiving node, including determining the HARQ-ACK codebook and the time unit for transmitting the HARQ-ACK codebook based on the first type of data and/or the first type of control signaling, and controlling the transceiver to transmit the HARQ-ACK codebook to the first type of transceiving node through a second type of physical channel at a time unit; in the case where the second type of transceiving node is configured with two levels of priorities, when the HARQ-ACK codebooks with different priorities are multiplexed in the same second type of physical channel for transmission, determine the HARQ-ACK codebook according to an indication information of the HARQ-ACK codebook whose priority is different from the priority of the data scheduled by the first type of control signaling, which is indicated by a first type of control signaling.

According to an aspect of the present disclosure, a method performed by a first type of transceiving node in a wireless communication system is provided. The method includes transmitting a first type of data and/or a first type of control signaling to a second type of transceiving node; receiving a HARQ-ACK codebook from the second type of transceiving node through a second type of physical channel at a time unit, wherein the HARQ-ACK codebook and the time unit are determined by the second type of transceiving node based on the received first type of data and/or the received first type of control signaling, and wherein in the case where the second type of transceiving node is configured with two levels of priorities, when the HARQ-ACK codebooks with different priorities are multiplexed in the same second type of physical channel for transmission, determining the HARQ-ACK codebook according to an indication information of the HARQ-ACK codebook whose priority is different from the priority of the data scheduled by the first type of control signaling, which is indicated by a first type of control signaling.

According to an aspect of the present disclosure, a first type of transceiving node in a wireless communication system is provided, which includes a transceiver configured to transmit a first type of data and/or a first type of control signaling to a second type of transceiving node and receive a HARQ-ACK codebook from the second type of transceiving node through a second type of physical channel at a time unit; and a controller configured to control an overall operation of the first type of transceiving node; control the transceiver to transmit the first type of data and/or the first type of control signaling to the second type of transceiving node and receive the HARQ-ACK codebook from the second type of transceiving node through a second type of physical channel at the time unit, wherein the HARQ-ACK codebook and the time unit are determined by the second type of transceiving node based on the received first type of data and/or the received first type of control signaling, and wherein in the case where the second type of transceiving node is configured with two levels of priorities, when the HARQ-ACK codebooks with different priorities are multiplexed in the same second type of physical channel for transmission, determining the HARQ-ACK codebook according to an indication information of the HARQ-ACK codebook whose priority is different from the priority of the data scheduled by the first type of control signaling, which is indicated by a first type of control signaling.

According to an aspect of the present disclosure, a method performed by a second type of transceiving node in a wireless communication system is provided. The method includes: receiving a first type of data and/or a first type of control signaling from a first type of transceiving node; determining a second type of control signaling and a time unit used for transmitting the second type of control signaling based on the first type of data and/or the first type of control signaling; and transmitting the second type of control signaling to the first type of transceiving node in the determined time unit.

The second type of transceiving node may be configured with two priorities for transmissions to the first type of transceiving node, the two priorities include a first priority and a second priority that are different from each other, the first priority is higher than the second priority, and the first priority is indicated by a first priority index, and the second priority is indicated by a second priority index; when the second type of control signaling with different priority indexes is multiplexed in a same physical uplink control channel (PUCCH) for transmission, determining PUCCH transmit power based on a total of the second type of control signaling.

For PUCCH format 2, PUCCH format 3 and PUCCH format 4, calculating a PUCCH transmit power adjustment parameter used for determining the PUCCH transmit power may be based on one or more of the following parameters included in the second type of control signaling: the number of HARQ-ACK information bits used for power control, which includes the sum of the number of HARQ-ACK information bits used for power control for HARQ-ACK codebooks with different priority indexes; the number of information bits of a scheduling request (SR) and/or link recovery request (LRR), which includes the sum of the number of SR and/or LRR information bits with different priority indexes, or which is the number of SR and/or LRR information bits with the first priority index, or which is the number of SR and/or LRR information bits with the second priority index; and the number of information bits of channel state information (CSI), which is the sum of the number of CSI information bits with different priority indexes; or, which is the number of CSI information bits with the first priority index; or, which is the number of CSI information bits with the second priority index.

When a value corresponding to the PUCCH transmit power is greater than a first threshold value, the method includes only transmitting the second type of control signaling with the first priority index without transmitting the second type of control signaling with the second priority index; or, only transmitting the second type of control signaling with the first priority index and part of the second type of control signaling with the second priority index without transmitting other part of the second type of control signaling with the second priority index.

When the value corresponding to the PUCCH transmit power that is calculated based on the second type of control signaling with the first priority index and the part of the second type of control signaling with the second priority index is less than or equal to the first threshold value, the method includes transmitting the part of the second type of control signaling with the second priority index; otherwise, not transmitting the second type of control signaling with the second priority index.

When the value corresponding to the PUCCH transmit power is greater than or equal to the first threshold value+$\Delta$, the method includes only transmitting the second type of control signaling with the first priority index without transmitting the second type of control signaling with the second priority index; or, only transmitting the second type of control signaling with the first priority index and part of the second type of control signaling with the second priority index without transmitting other part of the second type of control signaling with the second priority index, wherein, $\Delta$ is a parameter greater than 0.

When the value corresponding to the PUCCH transmit power that is calculated based on the second type of control signaling with the first priority index and the part of the second type of control signaling with the second priority index is less than or equal to the first threshold value, the method includes transmitting the part of the second type of control signaling with the second priority index; otherwise, not transmitting the second type of control signaling with the second priority index.

When the second type of control signaling with different priority indexes is multiplexed in a same PUCCH for transmission, the method includes determining the PUCCH transmit power based on the second type of control signaling with the first priority index.

For PUCCH format 2, PUCCH format 3 and PUCCH format 4, the method includes calculating a PUCCH transmit power adjustment parameter used for determining the PUCCH transmit power based on one or more of the following parameters included in the second type of control signaling: the number of HARQ-ACK information bits used for power control, which is the number of HARQ-ACK information bits used for power control for HARQ-ACK codebook with the first priority index; the number of SR and/or LRR information bits, which is the number of SR and/or LRR information bits with the first priority index; the number of information bits of CSI, which is the number of CSI information bits with the first priority index; and the number of resource elements (REs) for transmitting the second type of control signaling with the first priority index.

The method includes calculating the PUCCH transmit power adjustment parameter separately according to the second type of control signaling with different priorities, and then taking the maximum value or minimum value thereof to further determine the PUCCH transmit power.

When the second type of control signaling with a same priority index are multiplexed in a same PUCCH for transmission, if the second type of control signaling includes a Part 1 CSI with the first priority and a Part 2 CSI with the second priority, the method includes determining the PUCCH transmit power based on at least one of Part 1 CSI and Part 2 CSI.

For PUCCH format 2, PUCCH format 3 and PUCCH format 4 and for a case where the number of bits of the second type of control signaling excluding Part 2 CSI is less than or equal to 11, the method includes calculating a PUCCH transmit power adjustment parameter for determining the PUCCH transmit power based on one or more of the following parameters included in the second type of control signaling: the number of Part 1 CSI information bits; and the number of REs for transmitting the second type of control signaling excluding Part 2 CSI.

For PUCCH format 2, PUCCH format 3 and PUCCH format 4 and for a case where the number of bits of the second type of control signaling excluding Part 2 CSI is larger than 11, calculating a PUCCH transmit power adjustment parameter used for determining the PUCCH transmit power based on one or more of the following parameters included in the second type of control signaling: the number of Part 1 CSI information bits; the number of cyclic redundancy check (CRC)_bits for HARQ-ACK, and/or SR, and/or Part 1 CSI; and the number of REs for transmitting the second type of control signaling excluding Part 2 CSI.

When a value corresponding to the PUCCH transmit power is larger than a first threshold value, the method includes only transmitting the second type of control signaling excluding Part 2 CSI without transmitting Part 2 CSI; or, when the value corresponding to the PUCCH transmit power is greater than or equal to the first threshold value+$\Delta$, only transmitting the second type of control signaling excluding Part 2 CSI without transmitting Part 2 CSI, wherein $\Delta$ is a parameter larger than 0.

When calculating the PUCCH transmit power adjustment parameter used for determining the PUCCH transmit power, the method includes calculating the PUCCH transmit power adjustment parameter separately according to Part 2 CSI the second type of control signaling excluding Part 2 CSI, and then taking the maximum value or minimum value thereof to further determine the PUCCH transmit power.

When the second type of control signaling and/or data with different priority indexes are multiplexed, the method includes sorting priorities of different channels, and then performing power allocation according to the priority sorting.

The priorities may be sorted from high to low in the following order: PUSCH with HARQ-ACK with the first priority index, or PUCCH with HARQ-ACK or SR or LRR with the first priority index, wherein, the PUSCH is a PUSCH with the second priority index or a PUSCH with the first priority index, and the PUCCH is a PUCCH with the second priority index or a PUCCH with the first priority index; PUSCH transmission with CSI with the first priority index or PUCCH transmission with CSI with the first priority index, wherein, the PUSCH is a PUSCH with the second priority index or a PUSCH with the first priority index, and the PUCCH is a PUCCH with the second priority index or a PUCCH with the first priority index; PUSCH transmission with the first priority index without HARQ-ACK or CSI with the first priority index.

According to an aspect of the present disclosure, a second type of transceiving node in a wireless communication system is provided, which includes a transceiver configured to receive a first type of data and/or a first type of control signaling from a first type of transceiving node, and transmit a HARQ-ACK codebook to the first type of transceiving node in a time unit; and a controller configured to control an overall operation of the second type of transceiving node, including determining the HARQ-ACK codebook and the time unit used for transmitting the HARQ-ACK codebook based on the first type of data and/or the first type of control signaling; and controlling the transceiver to transmit the HARQ-ACK codebook to the first type of transceiving node in the determined time unit.

According to an aspect of the present disclosure, a method performed by a first type of transceiving node in a wireless communication system is provided. The method includes transmitting a first type of data and/or a first type of control signaling to a second type of transceiving node; and receiving a HARQ-ACK codebook from the second type of transceiving node in a time unit, wherein the HARQ-ACK codebook and the time unit are determined by the second type of transceiving node based on the received first type of data and/or the first type of control signaling.

According to an aspect of the present disclosure, a first type of transceiving node in a wireless communication system is provided. The first type of transceiving node includes a transceiver configured to transmit a first type of data and/or a first type of control signaling to a second type of transceiving node and receive a HARQ-ACK codebook from the second type of transceiving node in a time unit; and a controller configured to control an overall operation of the first type of transceiving node, including controlling the transceiver to transmit the first type of data and/or the first type of control signaling to the second type of transceiving node and receive a HARQ-ACK codebook from the second type of transceiving node in the time unit; wherein, the HARQ-ACK codebook and the time unit are determined by the second type of transceiving node based on the received first type of data and/or the first type of control signaling.

According to an aspect of the present disclosure, a method performed by a second type of transceiving node in a wireless communication system is provided. The method includes receiving a first type of data and/or a first type of control signaling from a first type of transceiving node; determining a hybrid automatic repeat request-acknowledgement (HARQ-ACK) codebook and a time unit for transmitting the HARQ-ACK codebook based on the first type of data and/or the first type of control signaling; and transmitting the HARQ-ACK codebook to the first type of transceiving node in the determined time unit, wherein the second type of transceiving node is configured with two levels of priorities for transmission to the first type of transceiving node, the two levels of priorities include a first priority and a second priority that are different from each other, the first priority is lower than the second priority, and the first priority is indicated by a first priority index, and the second priority is indicated by a second priority index.

When a PUCCH of the first priority index and one PUCCH of the second priority index overlap in time, the method includes determining how to multiplex the uplink control information (UCI) included in the PUCCH of the first priority index and the UCI included in the PUCCH of the second priority index based on whether the PUCCH of the second priority index includes a scheduling request (SR) and/or a link recovery request (LRR).

If the PUCCH of the second priority index includes an SR and/or LRR, the HARQ-ACK, and/or SR, and/or LRR included in the PUCCH of the second priority index and the HARQ-ACK included in the PUCCH of the first priority index may be multiplexed in a PUCCH, the CSI of the first priority index is not transmitted, and/or the SR and/or LRR of the first priority index are not transmitted.

If the PUCCH of the second priority index does not include SR and/or LRR, the HARQ-ACK included in the PUCCH of the second priority index and HARQ-ACK, and/or SR, and/or LRR included in the PUCCH of the first priority index are multiplexed in a PUCCH, the CSI of the first priority index is not transmitted; or, the HARQ-ACK included in the PUCCH of the second priority index and the HARQ-ACK included in the PUCCH of the first priority index are multiplexed in a PUCCH, the CSI of the first priority index is not transmitted, and/or the SR and/or LRR of the first priority index are not transmitted.

When a PUCCH of the first priority index and at least one PUSCH of the second priority index overlap in time, the method includes multiplexing based on one of the following approaches:
  Approach 1: multiplexing the HARQ-ACK of the first priority index and/or the CSI of the first priority index in the PUSCH of the second priority index which does not include the UCI information;
  Approach 2: multiplexing the HARQ-ACK of the first priority index in the PUSCH of the second priority index including the UCI information;
  Approach 3: if a resource of the PUSCH of the second priority index including the UCI information can carry the HARQ-ACK information of the first priority index, multiplexing the HARQ-ACK of the first priority index in the PUSCH of the second priority index including the UCI information; otherwise, multiplexing the HARQ-ACK of the first priority index in the PUSCH of the second priority index which does not include the UCI information;
  Approach 4: determining one PUSCH from the PUSCHs of the second priority index which satisfy a predefined condition, and then multiplexing the HARQ-ACK and/or CSI of the first priority index to the determined PUSCH.

When a PUCCH of the first priority index and at least one PUSCH of the first priority index overlap in time, the method includes determining PUSCH(s) of the first priority index which do(es) not collide with the PUSCH of the second priority index from the PUSCHs of the first priority index to form a set AO, and multiplexing the HARQ-ACK and/or CSI of the first priority index in a PUSCH in the set AO according to a specified method.

When a PUCCH of the second priority index and at least one PUSCH of the first priority index overlap in time, the method includes multiplexing based on one of the following approaches:
  Approach 1: multiplexing the HARQ-ACK, and/or an SR, and/or an LRR of the second priority index in the PUSCH of the first priority index which does not include the UCI information;
  Approach 2: multiplexing the HARQ-ACK, and/or SR, and/or LRR of the second priority index in the PUSCH of the first priority index including the UCI information;
  Approach 3: if a resource of the PUSCH of the first priority index including the UCI information can carry the HARQ-ACK, and/or SR, and/or LRR information of the second priority index, multiplexing the HARQ-ACK of the second priority index, an/or SR, and/or LRR of the second priority index in the PUSCH of the first priority index including the UCI information; otherwise, multiplexing the HARQ-ACK, and/or SR, and/or LRR of the second priority index in the PUSCH of the first priority index which does not include the UCI information;
  Approach 4: determining one PUSCH from the PUSCHs of the first priority index that satisfy predefined condition, and then multiplexing the HARQ-ACK, and/or SR, and/or LRR included in the PUCCH of the second priority index in the determined PUSCH.

When a PUSCH of the first priority index carrying the UCI of the first priority index overlaps with one PUSCH of the second priority index in the time domain, if the PUSCH of the second priority index satisfies a predefined condition, then the method includes multiplexing all or part information of the UCI of the first priority index in the PUSCH of the second priority index.

The predefined condition is that the PUSCH of the second priority index does not include the UCI information of the second priority index; or the predefined condition is that the PUSCH of the second priority index does not include the HARQ-ACK information of the second priority index.

When a HARQ-ACK codebook with a priority is a semi-static HARQ-ACK codebook, in the case where more than one PUSCH and the PUCCH carrying the HARQ-ACK overlap in time, one of the following approaches is used to multiplex the semi-static HARQ-ACK codebook in a PUSCH:
  Approach 1: determining one PUSCH from the PUSCHs that overlap with the PUCCH in the time domain according to a specified method;
  Approach 2: determining the PUSCH with the scheduling DCI indicating $V_{T-DAI}^{UL}=1$ from the PUSCHs that overlap with the PUCCH in the time domain, and denoting a set consisting of the determined PUSCHs as B0, wherein if set B0 is not empty, determining one PUSCH from the set B0, multiplexing HARQ-ACK in the determined PUSCH, or multiplexing HARQ-ACK in all PUSCHs in set B0, or multiplexing HARQ-ACK in part of the PUSCHs in the set B0; and/or, if the set B0 is empty, determining the PUSCH with scheduling DCI not indicating UL DAI field and the PUSCH without scheduling DCI from the PUSCHs that overlap with the PUCCH in the time domain, denoting a set consisting of the determined PUSCHs as B1, wherein if the set B1 is not empty, determining one PUSCH from the set B1, multiplexing the HARQ-ACK in the determined PUSCH; and/or if the set B0 is empty and the set B1 is empty, then transmitting the PUCCH, and not transmitting the PUSCH that overlaps with the PUCCH in the time domain;

Approach 3: determining the PUSCH with scheduling DCI indicating $V_{T-DAI}^{UL}=1$ from the PUSCHs that overlap with the PUCCH in the time domain, the PUSCH with scheduling DCI not indicating uplink DAI field, and the PUSCH without scheduling DCI, denoting a set consisting of the determined PUSCHs as B2, wherein if the set B2 is not empty, determining one PUSCH from the set B2 according to a specified method, and multiplexing HARQ-ACK in the determined PUSCH; or, if the set B2 is empty, transmitting PUCCH, not transmitting the PUSCH that overlaps with the PUCCH in the time domain.

According to an aspect of the present disclosure, a second type of transceiving node in a wireless communication system, which includes a transceiver configured to receive a first type of data and/or a first type of control signaling from a first type of transceiving node; and transmit a HARQ-ACK codebook to the first type of transceiving node in a time unit; a controller configured to control an overall operation of the second type of transceiving node, including determining the HARQ-ACK codebook and a time unit for transmitting the HARQ-ACK codebook based on the first type of data and/or the first type of control signaling; and controlling the transceiver to transmit the HARQ-ACK codebook to the first type of transceiving node in the determined time unit, wherein the second type of transceiving node is configured with two levels of priorities for transmission to the first type of transceiving node, the priorities including a first priority and a second priority that are different from each other, the first priority is lower than the second priority, and the first priority is indicated by a first priority index, and the second priority is indicated by a second priority index.

According to an aspect of the present disclosure, a method performed by a first type of transceiving node in a wireless communication system is provided. The method includes transmitting a first type of data and/or a first type of control signaling to a second type of transceiving node; receiving a HARQ-ACK codebook from the second type of transceiving node in a time unit, wherein the HARQ-ACK codebook and the time unit are determined by the second type of transceiving node based on the received first type of data and/or the received first type of control signaling, and wherein the second type of transceiving node is configured with two levels of priorities for transmission to the first type of transceiving node, the priorities including a first priority and a second priority that are different from each other, the first priority is lower than the second priority, and the first priority is indicated by a first priority index, and the second priority is indicated by a second priority index.

According to an aspect of the present disclosure, a first type of transceiving node in a wireless communication system, the first type of transceiving node including a transceiver configured to transmit a first type of data and/or a first type of control signaling to a second type of transceiving node and receive a HARQ-ACK codebook from the second type of transceiving node in a time unit; and a controller configured to control an overall operation of the first type of transceiving node, including controlling the transceiver to transmit the first type of data and/or the first type of control signaling to the second type of transceiving node and receive the HARQ-ACK codebook from the second type of transceiving node in the time unit, wherein the HARQ-ACK codebook and the time unit are determined by the second type of transceiving node based on the received first type of data and/or the received first type of control signaling; wherein the second type of transceiving node is configured with two levels of priorities for transmission to the first type of transceiving node, the priorities including a first priority and a second priority that are different from each other, the first priority is lower than the second priority, and the first priority is indicated by a first priority index, and the second priority is indicated by a second priority index.

BRIEF DESCRIPTION OF THE DRAWINGS

The above and other aspects and advantages of the present disclosure will become more apparent and easy to understand with the following description in conjunction with the accompanying drawings, in which.

DETAILED DESCRIPTION

Figure 1:
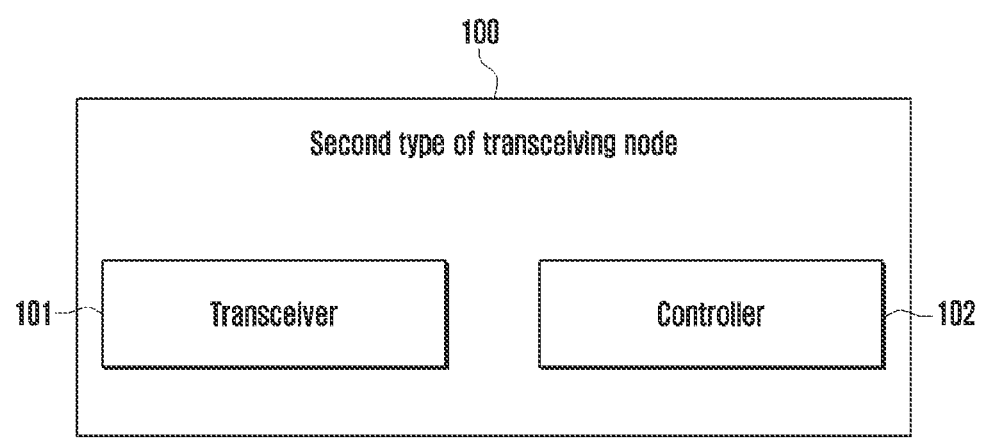
FIG. 1 illustrates a block diagram of a second type of transceiving node according to an embodiment.

The embodiments of this application are described below in detail, examples of which are shown in the accompanying drawings, wherein, throughout, the same or similar reference numerals represent the same or similar elements or elements having the same or similar functions. The embodiments described below with reference to the accompanying drawings are examples and only used to explain this application, and cannot be construed as a limitation on this application.

Those skilled in the art can understand that singular forms of "a", "an", "said" and "the" used herein may also include plural forms, unless specifically stated. It should be further understood that the word "comprise" used in the specification of this application refers to the presence of the described features, integers, steps, operations, elements and/or components, but does not exclude the presence or addition of one or more other features, integers, steps, operations, elements, components, and/or groups thereof.

Those skilled in the art can understand that, all terms (including technical terms and scientific terms) used herein have the same meaning as those generally understood by those of ordinary skill in the art to which this disclosure belongs, unless otherwise defined. It should also be understood that the terms such as those defined in a general dictionary should be understood to have meanings consistent with those in the context of the prior art, and would not be interpreted with idealized or excessively formal meanings, unless specifically defined as herein.

Those skilled in the art can understood that, "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a PCS (personal communications service), which may combine voice, data processing, fax and/or data communication capabilities; a PDA (personal digital assistant), which may include a radio frequency receiver, a pager, an internet/intranet access, a web browser, a notepad, a calendar and/or a GPS (global positioning system) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a MID (mobile internet device) and/or a mobile phone with music/video playing functions, a smart TV, a set-top box and other devices.

The 3GPP has defined three directions of 5G application scenarios-eMBB (enhanced mobile broadband), mMTC (massive machine-type communication) and URLLC (ultra-reliable and low-latency communication). Wherein, the eMBB scenario aims to further enhance user experience and mainly pursue ultimate communication experience between people. mMTC and URLLC are the application scenarios of the IoT, but their respective emphases are different: mMTC being mainly information interaction between people and things, while URLLC mainly reflecting communication requirements between things. In 5G, eMBB and URLLC will adopt a way of joint networking, that is, both URLLC services and eMBB services are supported in the same cell. Since URLLC services may be sparse services, compared with URLLC alone networking, eMBB and URLLC joint networking can improve the spectrum efficiency of the system. When there are URLLC services in the system, it is preferred to schedule URLLC services, and when there are no URLLC services in the system or the resources occupied by URLLC services are less, eMBB services can be scheduled. At present, when there is a conflict between URLLC services and eMBB services, data and/or control information of URLLC services will be preferentially transmitted, thus losing performance of eMBB services. How to optimize the transmission of data and control information of eMBB services is a problem to be solved urgently.

Various embodiments of this application will be described below in detail with reference to the accompanying drawings.

FIG. 1 illustrates a block diagram of a second type of transceiving node according to an embodiment of the present disclosure. This second type of transceiving node can implement various methods and/or algorithms implemented by the second type of transceiving node herein, but it does not imply a physical or structural restriction on the ways in which different embodiments can be implemented. Rather, the different embodiments of the present disclosure may be implemented in any suitably arranged system.

Referring to FIG. 1, the second type of transceiving node 100 may include a transceiver 101 and a controller 102.

The transceiver 101 may be configured to receive a first type of data and/or a first type of control signaling from a first type of transceiving node and transmit a second type of data and/or a second type of control signaling to the first type of transceiving node in a determined time unit.

The controller 102 may be a circuit-specific integrated circuit or at least one processor. The controller 102 may be configured to control an overall operation of the second type of transceiving node, and control the second type of transceiving node to implement the method disclosed in the present disclosure. Specifically, the controller 102 may be configured to determine, based on the first type of data and/or the first type of control signaling, the second type of data and/or the second type of control signaling and the time unit for transmitting the second type of data and/or the second type of control signaling and the power for transmitting the second type of data and/or the second type of control signaling, and control the transceiver 101 to transmit the second type of data and/or the second type of control signaling to the first type of transceiving node in the determined time unit.

In the present disclosure, the first type of transceiving node may be a base station (BS), and the second type of transceiving node may be a UE user equipment (UE). In the following examples, a base station is taken as an example (but not limited thereto) to describe the first type of transceiving node, and UE is taken as an example (but not limited thereto) to describe the second type of transceiving node.

The first type of data may be data transmitted by the first type of transceiving node to the second type of transceiving node. In the following examples, downlink data carried by a physical downlink shared channel (PDSCH) is taken as an example (but not limited thereto) to illustrate the first type of data.

The second type of data may be data transmitted by the second type of transceiving node to the first type of transceiving node. In the following examples, uplink data carried by a physical uplink shared channel (PUSCH) is taken as an example (but not limited thereto) to illustrate the second type of data.

The first type of control signaling may be control signaling transmitted by the first type of transceiving node to the second type of transceiving node. In the following examples, downlink control signaling is taken as an example (but not limited thereto) to illustrate the first type of control signaling. The downlink control signaling may be downlink control information (DCI) carried by a physical downlink control channel (PDCCH) and/or control signaling carried by a PDSCH. In an embodiment, the DCI is transmitted through various DCI formats.

The second type of control signaling may be control signaling transmitted by the second type of transceiving node to the first type of transceiving node. In the following examples, uplink control signaling is taken as an example (but not limited thereto) to illustrate the second type of control signaling. The uplink control signaling may be uplink control information (UCI) carried by a physical uplink control channel (PUCCH) and/or control signaling carried by a PUSCH. A type of UCI may contain HARQ-ACK information, SR, LRR and CSI.

A first type of time unit is a time unit in which the first type of transceiving node transmits the first type of data and/or the first type of control signaling. In the following examples, a downlink time unit is taken as an example (but not limited thereto) to illustrate the first type of time unit.

A second type of time unit is a time unit in which the second type of transceiving node transmits the second type of data and/or the second type of control signaling. In the following examples, an uplink time unit is taken as an example (but not limited thereto) to illustrate the second type of time unit.

The first type of time unit and the second type of time unit may be one or more slots, one or more sub-slots, one or more Orthogonal Frequency Division Multiplexing (OFDM) symbols, or one or more subframes.

Depending on the network type, the term "base station" or "BS" can refer to any component (or collection of components) configured to provide wireless access to a network, such as a transmit point (TP), a transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), LTE, LTE advanced (LTE-A), high speed packet access (HSPA), Wi-Fi 802.11a/b/g/n/ac, etc. For the sake of convenience, the terms "BS" and "TRP" are used interchangeably herein to refer to network infrastructure components that provide wireless access to remote terminals. Also, depending on the network type, the term "user equipment" or "UE" can refer to any component such as "mobile station," "subscriber station," "remote terminal," "wireless terminal," "receive point," "user device," or simply "terminal." For the sake of convenience, the terms "user equipment" and "UE" are used herein to refer to remote wireless equipment that wirelessly accesses a BS, whether the UE is a mobile device (such as a mobile telephone or smartphone) or is normally considered a stationary device (such as a desktop computer or vending machine).

Figure 2:
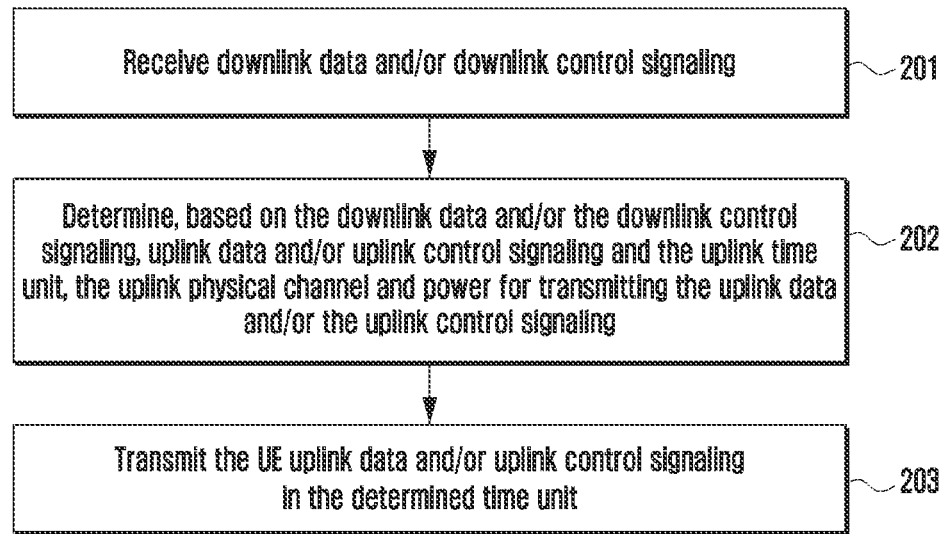
FIG. 2 illustrates a flowchart of a method performed by a UE according to an embodiment.

FIG. 2 illustrates a flowchart of a method performed by a UE according to embodiments of the present disclosure.

Embodiment 1

In step 201, the UE receives downlink data and/or downlink control signaling from a base station.

In step 202, the UE determines uplink data and/or uplink control signaling and an uplink time unit and/or an uplink physical channel based on the downlink data and/or downlink control signaling.

In step 203, the UE transmits the uplink data and/or the uplink control signaling to the base station at the determined uplink time unit.

According to an embodiment, the UE can be configured with two levels of priorities, which are priority index 0 and priority index 1, respectively. Priority index 1 is higher than priority index 0. The two levels of priorities can be two physical layer priorities. Specifically, a PUSCH or PUCCH transmission (including a transmission with repetitions if there is a transmission with repetitions) can be priority index 0 or priority index 1. For configured grant PUSCH transmission, the UE determines the priority index according to the parameter priority (if configured). For PUCCH transmission with HARQ-ACK information corresponding to semi-persistent scheduling (SPS) PDSCH reception or SPS PDSCH release, the UE determines the priority index from the parameter HARQ CodebookID (if configured). If no priority index is configured for UE for a PUSCH or PUCCH transmission, the priority index is 0.

If the UE monitors PDCCH in an activated downlink bandwidth part (DL BWP) for detection of DCI format 0_1 and DCI format 1_1, or for detection of DCI format 0_2 and DCI format 1_2, the priority index may be provided by a priority indicator field. If the UE indicates a capability to monitor PDCCH in an activated DL BWP for detection of DCI format 0_1 and DCI format 1_1, and for detection of DCI format 0_2 and DCI format 1_2, DCI format 0_1 or DCI format 0_2 may schedule a PUSCH transmission with any priority, and DCI format 1_1 or DCI format 1_2 may schedule a PDSCH reception and trigger a PUCCH transmission of corresponding HARQ-ACK information with any priority.

The UE may be configured with a PUCCH configuration list, and the PUCCH configuration list can include two PUCCH configurations. The priority of the first PUCCH configuration can be priority index 0. The priority of the second PUCCH configuration can be priority index 1.

A sub-slot length of each PUCCH configuration may be 7 OFDM symbols or 2 OFDM symbols. Sub-slot lengths of different PUCCH configurations may be configured separately.

The UE can be configured with a pdsch-HARQ-ACK-CodebookList, the pdsch-HARQ-ACK-CodebookList can include two pdsch-HARQ-ACK-Codebook configurations. The priority of the first pdsch-HARQ-ACK-Codebook can be priority index 0. The priority of the second pdsch-HARQ-ACK-Codebook can be priority index 1. The pdsch-HARQ-ACK-Codebook is used to configure the HARQ-ACK codebook type, when the HARQ-ACK codebook type is dynamic codebook (Type-2 codebook) or enhanced dynamic codebook (Type-2 codebook supporting grouping and HARQ-ACK retransmission), in DCI, it is needed to indicate the assignment index information to ensure the reliability of the HARQ-ACK codebook. In the present disclosure, the assignment index can be downlink assignment index (DAI). In the following example, DAI is taken as an example (but not limited to) to describe the assignment index.

A DAI field includes at least one of a first type of DAI and a second type of DAI. The first type of DAI can be C-DAI (counter-DAI). The first type of DAI can indicate the cumulative number of scheduled PDSCH(s), and/or DCI(s) indicating SPS PDSCH release, and/or DCI(s) indicating secondary cell (Scell) dormancy in the current downlink time unit. The order of the respective bits of DCIs in HARQ-ACK codebook corresponding to the PDSCH reception(s), and/or DCI(s) indicating SPS PDSCH release, and/or DCI(s) indicating Scell dormancy can be determined by the receiving time of the first type of DAI and the information of the first type of DAI. The first type of DAI can be included in a downlink DCI format.

The second type of DAI can be T-DAI (total-DAI). The second type of DAI can be the total number of DCI(s) indicating PDSCH reception(s), and/or DCI(s) indicating SPS PDSCH release, and/or DCI(s) indicating Scell dormancy, corresponding to the uplink time unit. The first type of DAI can be included in a downlink DCI format and/or an uplink DCI format. The second type of DAI in the uplink DCI format is also called UL DAI.

In the following example, C-DAI is taken as an example (but not limited to) to describe the first type of DAI, and T-DAI is taken as an example (but not limited to) to describe the second type of DAI.

The number of bits for C-DAI and T-DAI is limited. For example, when C-DAI or T-DAI is represented by 2 bits, C-DAI or T-DAI greater than 4 may be represented by the equation in Table 1. Table 1 shows a correspondence relationship between the DAI field and $V_{T\text{-}DAI,m}$ or $V_{C\text{-}DAI,c,m}$. $V_{T\text{-}DAI,m}$ is the value of T-DAI in DCI received in the PDCCH monitoring occasion m, and $V_{C\text{-}DAI,c,m}$ is the value of C-DAI in DCI about serving cell c received in PDCCH monitoring occasion m. Both $V_{T\text{-}DAI,m}$ and $V_{C\text{-}DAI,c,m}$ are related to the number of bits of the DAI field in DCI. MSB refers to the most significant bit, and LSB refers to the least significant bit.

TABLE 1

| DAI MSB, LSB | $V_{T-DAI,m}$ or $V_{C-DAI,c,m}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

When C-DAI or T-DAI is 1, 5 or 9, as shown in Table 1, they are all indicated by "00" in DAI field, and the value of $V_{T-DAI,m}$ or $V_{C-DAI,c,m}$ is expressed as "1" by the equation in Table 1. Y represents the number of DCI actually transmitted by the BS.

In the case where C-DAI or T-DAI in the DCI is 1 bit, values greater than 2 may be expressed by the equation in Table 2.

TABLE 2

| DAI | $V_{T-DAI,m}$ or $V_{C-DAI,c,m}$ | Y |
|---|---|---|
| 0 | 1 | (Y − 1) mod 2 + 1 = 1 |
| 1 | 2 | (Y − 1) mod 2 + 1 = 2 |

When HARQ-ACK codebooks with different priorities are multiplexed in a same PUCCH or PUSCH for transmission, how to determine the HARQ-ACK codebooks with respective priorities is a problem that needs to be solved. For example, the HARQ-ACK codebook type with priority index 0 is a dynamic codebook, such as 3GPP TS38.213 Type-2 codebook, and the HARQ-ACK codebook type with priority index 1 is a semi-static codebook, such as 3GPP TS38. 213 Type-1 codebook. DCI #1 schedules a PDSCH #1 with priority index 0 to be feedback in time slot n, DCI #2 schedules a PDSCH #2 with priority index 0 to be feedback in time slot n, and DCI #3 schedules a PDSCH #3 with priority index 1 to be feedback in time slot n. The starting time of the PDCCH carrying DCI #1 is earlier than the starting time of the PDCCH carrying DCI #2, and the starting time of the PDCCH carrying DCI #2 is earlier than the starting time of the PDCCH carrying DCI #3. At present, the DCI only indicates the information of the HARQ-ACK codebook with the same priority as the scheduled data. If there is missed detection for DCI #2, the UE would feed back 2 bits of HARQ-ACK information in time slot n, and the base station will expect to receive 3 bits HARQ-ACK information. At this time, the base station cannot be able to successfully receive HARQ-ACK information.

In order to solve this problem, the following methods can be used.

HARQ-ACK indication information that is different from the priority of the data scheduled by a DCI format is indicated in the DCI format, for example, DAI information, and/or PUCCH resource information. The DAI information can be C-DAI, and/or T-DAI. The DCI format can be a downlink DCI format, and/or an uplink DCI format. When the DCI format is a downlink DCI format, the UE uses the PUCCH resource indicated by the downlink DCI format to transmit HARQ-ACK information. When the DCI format is an uplink DCI format, the UE uses the PUSCH scheduled by the uplink DCI format to transmit HARQ-ACK information. T-DAI can include UL DAI in an uplink DCI format.

One or more fields and/or one or more bits in a DCI format can be reused, or one or more fields can be added, and/or one or more bits can be added into a DCI format to indicate HARQ-ACK indication information with different priorities from the priority of the data scheduled by the DCI format.

When the number of HARQ-ACK sub-codebooks included in a HARQ-ACK codebook is greater than or equal to 1, the DAI information can include the T-DAI of respective HARQ-ACK sub-codebooks. When the number of PDSCH groups is greater than or equal to 1, the DAI information can include T-DAI of one or more PDSCH groups. Wherein, the HARQ-ACK codebook of a PDSCH group can include one or more HARQ-ACK sub-codebooks, and the T-DAI of a PDSCH group can include T-DAIs of one or more HARQ-ACK sub-codebooks of the PDSCH group.

The UE determines the size of the HARQ-ACK codebooks of respective priorities and/or the PUCCH/PUSCH information carrying the HARQ-ACK codebooks according to the HARQ-ACK indication information indicated by the last detected DCI format. It should be noted that the last DCI format is the DCI format relating to HARQ-ACK codebook and is the latest received one by the UE in time sequence. For example, the last DCI format can be the last downlink DCI format in the PDCCH monitoring occasion set M. The PDCCH monitoring occasion set M can be a set of DAI counting occasions or PDCCH monitoring occasions corresponding to the HARQ-ACK codebooks transmitted at an uplink time unit determined based on the downlink control signaling. Alternatively, the last DCI format can be an uplink DCI format.

For different priorities, the UE generates a HARQ-ACK codebook with a priority according to the HARQ-ACK indication information with the priority indicated by the last DCI format, and/or determines the size of the HARQ-ACK codebook with the priority. For a dynamic codebook with a priority, such as 3GPP TS38.213 Type-2 codebook, and/or enhanced dynamic codebook, such as 3GPP TS38.213 Type-2 codebook grouping and HARQ-ACK retransmission, the UE can determine the size of the HARQ-ACK codebook with the priority according to the T-DAI of the priority indicated by the last DCI format.

When the number of HARQ-ACK sub-codebooks included in a HARQ-ACK codebook is greater than or equal to 1, for each HARQ-ACK sub-codebook of the HARQ-ACK codebook, the UE respectively determines the size of the HARQ-ACK sub-codebook according to the T-DAI of the HARQ-ACK sub-codebook of the HARQ-ACK codebook indicated by the last DCI format. The last DCI format can use different fields and/or different bits to indicate the T-DAI of respective HARQ-ACK sub-codebooks of the HARQ-ACK codebook, or the last DCI format can use the same field, and/or the same bit to indicate the T-DAI of respective HARQ-ACK sub-codebooks of the HARQ-ACK codebook. The bits indicating the T-DAI of each HARQ-ACK sub-codebook with one priority can be the same or different. The bits indicating the T-DAI of respective HARQ-ACK sub-codebooks with different priorities can be the same or different. The number of bits indicating the T-DAI of respective HARQ-ACK sub-codebooks with a priority can be two or one.

When the number of PDSCH groups with a priority is greater than or equal to 1, for each PDSCH group with the priority, the UE respectively determines the size of the HARQ-ACK codebook of the PDSCH group with the priority according to the T-DAI of the PDSCH group with this priority indicated by the last DCI format. The bits of the indicated T-DAI of the HARQ-ACK codebook of respective PDSCH groups with a priority can be the same or different. The bits of the indicated T-DAI of the HARQ-ACK codebook of respective PDSCH groups with different priorities can be the same or different. For a PDSCH group with a priority, when the number of HARQ-ACK sub-codebooks included in the HARQ-ACK codebook is greater than or equal to 1, for each HARQ-ACK sub-codebook of the PDSCH group with the priority, the UE respectively determines the size of the HARQ-ACK sub-codebook of the PDSCH group with the priority according to the T-DAI of the HARQ-ACK sub-codebook of the PDSCH group with the priority indicated by the last DCI format. The bits of the indicated T-DAI of respective HARQ-ACK sub-codebooks of a PDSCH group with a priority can be the same or different. The bits of the indicated T-DAI of respective HARQ-ACK sub-codebooks of respective PDSCH groups with a priority can be the same or different. The bits of the indicated T-DAI of respective HARQ-ACK sub-codebooks of respective PDSCH groups with respective priorities can be the same or different.

For a HARQ-ACK codebook with a priority, according to the pseudo-code for the HARQ-ACK codebook generation in 3GPP TS 38.213 9.1.3.1, after the completion of the c and m loops, the UE sets $V_{temp2}$ as the T-DAI of HARQ-ACK codebook with the priority indicated by the last DCI format.

For a HARQ-ACK sub-codebook with a priority, according to the pseudo-code for the HARQ-ACK codebook generation in 3GPP TS 38.213 9.1.3.1, after the completion of the c and m loops, the UE sets $V_{temp2}$ as the T-DAI of HARQ-ACK codebook with the priority indicated by the last DCI format.

For a PDSCH group with a priority, according to the pseudo-code for the HARQ-ACK codebook generation in 3GPP TS 38.213 9.1.3.1, after the completion of the c and m loops, the UE sets $V_{temp2}$ as the T-DAI of HARQ-ACK codebook with the priority indicated by the last DCI format.

For a HARQ-ACK sub-codebook of a PDSCH group with a priority, according to the pseudo-code for the HARQ-ACK codebook generation in 3GPP TS 38.213 9.1.3.1, after the completion of the c and m loops, the UE sets $V_{temp2}$ as the T-DAI of HARQ-ACK codebook with the priority indicated by the last DCI format.

This method specifies how to determine the HARQ-ACK codebooks with respective priorities when PUCCH and/or PUSCH carrying HARQ-ACK information with different priorities need to be multiplexed in a PUCCH and/or PUSCH. HARQ-ACK indication information that is different from the priority of the data scheduled by a DCI format is indicated by reusing one or more fields and/or one or more bits in the DCI format, or adding one or more fields and/or adding one or more bits in the DCI format. This method avoids the problem of inconsistent understanding of the size of the HARQ-ACK codebook between the UE and the base station caused by the missed detection of DCI with lower priority, improves the reliability of HARQ-ACK codebook transmission, and improves the reliability of services with higher priority. This method reuses the fields in the current DCI to indicate DAI information, which reduces the DCI signaling overhead.

The scenarios in which the UCI information and/or data with the priority index 0 and the UCI information and/or data with the priority index 1 can be multiplexed and the scenarios in which the UCI information and/or data with the priority index 0 and the UCI information and/or data with the priority index 1 cannot be multiplexed need to be defined.

When PUCCH and/or PUSCH carrying HARQ-ACKs with different priorities satisfy certain condition(s), the UE can multiplex UCI information and/or data with different priorities in a PUCCH or PUSCH for transmission according to a predefined rule or higher layer signaling configuration and/or DCI dynamical indication. Specifically, when the UE is configured with a certain parameter, the UE multiplexes UCI information and/or data with different priorities in a PUCCH or PUSCH for transmission according to a predefined rule. Alternatively, when the UE is configured with a certain parameter, the base station can use 1 bit in the DCI to dynamically indicate whether to multiplex UCI information and/or data with different priorities in a PUCCH or PUSCH for transmission. For example, 1 indicates that multiplexing is allowed, and 0 indicates that multiplexing is not allowed, or it is possible that 0 indicates that multiplexing is allowed, and 1 indicates that multiplexing is not allowed. The UE determines whether to multiplex UCI information and/or data with different priorities in a PUCCH or PUSCH for transmission according to the 1-bit indication information of the last DCI. The condition(s) can be at least one of:

Condition 1: when the PUCCH(s) or PUSCH(s) carrying the HARQ-ACK codebook with priority index 1 and the PUCCH(s) or PUSCH(s) carrying the HARQ-ACK codebook with priority index 0 overlap in time.

Condition 2: when the PUCCH(s) or PUSCH(s) carrying the HARQ-ACK codebook with priority index 1 and the PUCCH(s) or PUSCH(s) carrying the HARQ-ACK codebook with priority index 0 are located in a same uplink time unit.

Condition 3: when the uplink time unit of PUCCH(s) or PUSCH(s) carrying the HARQ-ACK codebook with priority index 1 and the uplink time unit of PUCCH(s) or PUSCH(s) carrying the HARQ-ACK codebook with priority index 0 overlap in time.

Condition 4: the pdsch-HARQ-ACK-Codebook parameter configuration of the HARQ-ACK codebook with priority index 0, and/or the pdsch-HARQ-ACK-Codebook parameter configuration of the HARQ-ACK codebook with priority index 1 satisfy a configuration condition. The configuration condition can be that the pdsch-HARQ-ACK-Codebook parameter of the HARQ-ACK codebook with priority index 0 is a certain configuration, such as a semi-static codebook and/or a dynamic codebook. The configuration condition can also be that the pdsch-HARQ-ACK-Codebook parameter of the HARQ-ACK codebook with priority index 1 is a certain configuration, such as a semi-static codebook and/or a dynamic codebook. The configuration condition can also be that the pdsch-HARQ-ACK-Codebook parameter of the HARQ-ACK codebook with priority index 0 is a certain configuration, for example, a semi-static codebook, and/or a dynamic codebook and the pdsch-HARQ-ACK-Codebook parameter of the HARQ-ACK codebook with priority index 1 is a certain configuration, such as a semi-static codebook and/or a dynamic codebook. It can also define that when priority index 0 is the enhanced dynamic codebook and priority index 1 is the semi-static codebook, the UE does not expect to multiplex two HARQ-ACK codebooks in a PUCCH for transmission. Alternatively, it can also define that when priority index 0 is the enhanced dynamic codebook, the UE does not expect to multiplex two HARQ-ACK codebooks in a PUCCH for transmission.

Condition 5: the capability reported by the UE supports multiplexing of UCI information and/or data with different priorities for transmission in a PUCCH or PUSCH. Specifically, the UE can report whether it supports UCI information and/or data with different priorities being multiplexed in a PUCCH or PUSCH for transmission. Alternatively, the UE can separately report whether it supports multiplexing of UCI information with different priorities in a PUCCH for transmission and whether it supports multiplexing of UCI information with different priorities in a PUSCH for transmission. When a capability reported by the UE supports multiplexing of UCI information and/or data with different priorities in a PUCCH or PUSCH for transmission, the network can instruct the UE to multiplex UCI information and/or data with different priorities in a PUCCH or PUSCH for transmission through higher layer signaling or dynamical indication.

This method defines the condition(s) under which UCI information and/or data with different priorities are multiplexed in a PUCCH or PUSCH for transmission, clarifies the behavior of the UE, and ensures a consistent understanding between the UE and the base station of whether UCI information and/or data with different priorities are multiplexed in a PUCCH or PUSCH for transmission, and improves the reliability of PUCCH and PUSCH transmission.

When a DCI format can schedule data with different priorities, the different configuration parameters related to HARQ-ACK with different priorities can cause the number of bits corresponding to one or more fields of the DCI format to be different when the DCI format schedules data with different priorities. In order to solve the problem of different sizes of DCI when scheduling data with different priorities, the following methods can be used.

It should be noted that the above methods are explained by taking one HARQ-ACK codebook corresponding to one PDSCH group as an example. The above methods are also applicable to the scenario where one HARQ-ACK codebook corresponds to multiple PDSCH groups. Take two PDSCH groups as an example, namely PDSCH group 0 and PDSCH group 1 (where 0 and 1 are the PDSCH group numbers). It is possible to generate HARQ-ACK codebooks for PDSCH group 0 and PDSCH group 1, respectively, and then generate a total HARQ-ACK codebook.

If the DCI format 1_x (x can be 1 or 2) can dynamically indicate the priority of the scheduled data, that is, the DCI format 1_x includes the priority indicator field, when a bit width of the PDSCH group number of the DCI format 1_x of a HARQ-ACK codebook is not equal to the bit width of the PDSCH group number of the DCI format 1_x of another HARQ-ACK codebook, '0' is inserted into one or more MSBs of the field with the smaller bit width of the PDSCH group number, until the bit width of the PDSCH group numbers of the DCI format 1_x of the two HARQ-ACK codebooks are the same.

If the DCI format 1_x (x can be 1 or 2) can dynamically indicate the priority of the scheduled data, that is, the DCI format 1_x includes the priority indicator field, if the bit width of a new feedback indicator of the DCI format 1_x of a HARQ-ACK codebook is not equal to the bit width of a new feedback indicator of the DCI format 1_x of another HARQ-ACK codebook, '0' is inserted into one or more MSBs of the field with the smaller bit width of the new feedback indicator, until the bit width of the new feedback indicators of the DCI format 1_x of the two HARQ-ACK codebooks are the same.

If the DCI format 1_x (x can be 1 or 2) can dynamically indicate the priority of the scheduled data, that is, the DCI format 1_x includes the priority indicator field, when a bit width of number of requested PDSCH group(s) field of the DCI format 1_x of a HARQ-ACK codebook is not equal to the bit width of number of requested PDSCH group(s) field of the DCI format 1_x of another HARQ-ACK codebook, '0' is inserted into one or more MSBs of the field with the smaller bit width of number of requested PDSCH group(s) field, until the bit width of number of requested PDSCH group(s) field of the DCI format 1_x of the two HARQ-ACK codebooks are the same.

This method defines the problem of different sizes of DCI when scheduling data with different priorities, reduces the number and time of UE blind detection, can also reduce the user plane delay, and can also increase the number of HARQ retransmissions, thereby improving the reliability of data transmission, and improving spectrum efficiency.

In a specific embodiment, the types of HARQ-ACK codebooks with different priorities can be different. The scenario in which the type of HARQ-ACK codebook with priority index 0 is dynamic codebook, such as 3GPP TS38.213 Type-2 codebook, and the type of HARQ-ACK codebook with priority index 1 is semi-static codebook, such as 3GPP TS38.213 Type-1 codebook is taken as an example to describe how to determine the HARQ-ACK codebook with priority index 0 when multiplexing HARQ-ACK codebooks with different priorities. This method is also applicable to how to determine the HARQ-ACK codebook with priority index 1 when multiplexing HARQ-ACK codebooks with different priorities in the scenario in which the type of HARQ-ACK codebook with priority index 1 is dynamic codebook, such as 3GPP TS38.213 Type-2 codebook, and the type of HARQ-ACK codebook with priority index 0 is semi-static codebook, such as 3GPP TS38.213 Type-1 codebook.

In this embodiment, code block group (CBG) retransmission is not configured. The downlink DCIs scheduling the PDSCH reception with priority index 0, and/or indicating SPS PDSCH release, and/or indicating Scell dormancy needs to indicate its corresponding DAI information. The downlink DCI scheduling the PDSCH reception with priority index 1, and/or indicating SPS PDSCH release, and/or indicating Scell dormancy does not need to indicate its corresponding DAI information.

A DAI field in a downlink DCI scheduling the PDSCH reception with priority index 1, and/or indicating SPS PDSCH release, and/or indicating Scell dormancy can indicate the DAI information of the HARQ-ACK codebook with priority index 0, such as T-DAI. Specifically, a field of the DAI information indicating the HARQ-ACK codebook with the priority index 0 in the downlink DCI scheduling the PDSCH reception with priority index 1, and/or indicating SPS PDSCH release, and/or indicating Scell dormancy can be C-DAI field and/or T-DAI field. Alternatively, N MSB or LSB of the DAI field in the downlink DCI scheduling the PDSCH reception with priority index 1, and/or indicating SPS PDSCH release, and/or indicating Scell dormancy is used to indicate the DAI information of the HARQ-ACK codebook with priority index 0, such as T-DAI.

The UE can determine a size of the HARQ-ACK codebook with priority index 0 according to the DAI information of the HARQ-ACK codebook with priority index 0 indicated by DAI field in the downlink DCI scheduling the PDSCH reception with priority index 1, and/or indicating SPS PDSCH release, and/or indicating Scell dormancy. Specifically, for a HARQ-ACK codebook with priority index 0, the UE would set $V_{temp2}$ as the DAI information of the HARQ-ACK codebook with priority index 0 indicated by DAI field in the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1.

It should be noted that in all embodiments of the present disclosure, PUCCH can carry other UCI information in addition to HARQ-ACK information.

This method specifies how to determine the HARQ-ACK codebook of respective priorities when PUCCHs carrying HARQ-ACK information with different priorities need to be multiplexed in a PUCCH. By reusing a DAI field in the downlink DCI scheduling semi-static codebook, the DAI information of a dynamic codebook with another priority is indicated. A consistent understanding of the size of the HARQ-ACK codebook between the base station and the UE is ensured, which improves the reliability of HARQ-ACK codebook transmission. This method indicates DAI information by reusing the field in the current DCI, which reduces the DCI signaling overhead.

In a specific embodiment, the type of HARQ-ACK codebooks with different priorities can be different. The scenario in which the type of HARQ-ACK codebook with priority index 0 is dynamic codebook, such as 3GPP TS38.213 Type-2 codebook, and the type of HARQ-ACK codebook with priority index 1 is semi-static codebook, such as 3GPP TS38.213 Type-1 codebook is taken as an example to describe how to determine the HARQ-ACK codebook with priority index 0 when multiplexing HARQ-ACK codebooks with different priorities. This method is also applicable to how to determine the HARQ-ACK codebook with priority index 1 when multiplexing HARQ-ACK codebooks with different priorities in the scenario in which the type of HARQ-ACK codebook with priority index 1 is dynamic codebook, such as 3GPP TS38.213 Type-2 codebook, and the type of HARQ-ACK codebook with priority index 0 is semi-static codebook, such as 3GPP TS38.213 Type-1 codebook.

In this embodiment, at least one serving cell is configured with CBG retransmission.

The UE can multiplex two HARQ-ACK codebooks in a PUCCH for transmission according to a predefined rule or higher layer signaling configuration or DCI dynamical indication. At this time, the HARQ-ACK codebook with priority index 0 and the HARQ-ACK codebook with priority index 1 need to be determined.

A DAI field in the downlink DCI scheduling the PDSCH reception with priority index 1, and/or indicating SPS PDSCH release, and/or indicating Scell dormancy can indicate the DAI information of the HARQ-ACK codebook with priority index 0, such as T-DAI. The DAI information can be DAI information of a TB-level HARQ-ACK sub-codebook with priority index of 0, such as T-DAI, and/or DAI information of a CBG-level HARQ-ACK sub-codebook with priority index of 0.

Specifically, the following two methods can be used:

Method 1: N1+N2 most significant bits (or least significant bits) of the DAI field in the downlink DCI scheduling the PDSCH reception with priority index 1, and/or indicating SPS PDSCH release, and/or indicating Scell dormancy are used to indicate the DAI information of the TB-level HARQ-ACK sub-codebook with priority index 0 (indicated by N1 bits, such as N1=2), such as T-DAI, and the DAI information of the CBG-level HARQ-ACK sub-codebook (indicated by N2 bits, such as N2=2), such as T-DAI.

Method 2: N most significant bits (or least significant bits) of the DAI field in the downlink DCI scheduling the PDSCH reception with priority index 1, and/or indicating SPS PDSCH release, and/or indicating Scell dormancy are used to indicate the DAI information of the TB-level HARQ-ACK sub-codebook with priority index 0 (indicated by N bits, such as N=2), such as T-DAI, and the DAI information of the CBG-level HARQ-ACK sub-codebook (indicated by N bits, such as N=2), such as T-DAI. At this time, the DAI information of the two HARQ-ACK sub-codebooks is the same.

When the number of bits in the DAI field is 4, Method 1 can be used. When the number of bits in the DAI field is 2, Method 2 can be used.

For the HARQ-ACK sub-codebook, the UE can determine the size of the HARQ-ACK sub-codebook with priority index 0 according to the DAI information of the PDSCH group with priority index 0 indicated by the DAI field in the downlink DCI scheduling the PDSCH reception with priority index 1, and/or indicating SPS PDSCH release, and/or indicating Scell dormancy, respectively. Specifically, for the TB-level HARQ-ACK sub-codebook with priority index 0, the UE would set $V_{temp2}$ as the DAI information of the TB-level HARQ-ACK sub-codebook with priority index 0 indicated by DAI field in the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1. For the CBG-level HARQ-ACK sub-codebook with priority index 0, the UE would set $V_{temp2}$ as the DAI information of the CBG-level HARQ-ACK sub-codebook with priority index 0 indicated by DAI field in the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1.

This method specifies how to determine the HARQ-ACK codebooks of respective priorities when PUCCHs carrying HARQ-ACK information with different priorities need to be multiplexed in a PUCCH. By reusing a DAI field in the downlink DCI scheduling semi-static codebook, the DAI information of the dynamic codebook with another priority is indicated. A consistent understanding of the size of the HARQ-ACK codebook between the base station and the UE is ensured, which improves the reliability of HARQ-ACK codebook transmission. This method indicates DAI information by reusing the existing DCI field, which reduces the DCI signaling overhead.

In a specific embodiment, the type of HARQ-ACK codebooks with different priorities can be different. The scenario in which the type of HARQ-ACK codebook with priority index 0 is enhanced dynamic codebook, such as 3GPP TS38.213 Type-2 codebook that supports grouping and HARQ-ACK retransmission, and the type of HARQ-ACK codebook with priority index 1 is semi-static codebook, such as 3GPP TS38.213 Type-1 codebook is taken as an example to describe how to determine the HARQ-ACK codebook with priority index 0 when multiplexing HARQ-ACK codebooks with different priorities. This method is also applicable to how to determine the HARQ-ACK codebook with priority index 1 when multiplexing HARQ-ACK codebooks with different priorities in the scenario in which the type of HARQ-ACK codebook with priority index 1 is enhanced dynamic codebook, such as 3GPP TS38.213 Type-2 codebook that supports grouping and HARQ-ACK retransmission, and the type of HARQ-ACK codebook with priority index 0 is semi-static codebook, such as 3GPP TS38.213 Type-1 codebook.

In this embodiment, CBG retransmission is not configured.

The UE can multiplex two HARQ-ACK codebooks in a PUCCH for transmission according to a predefined rule or higher layer signaling configuration or DCI dynamical indication. At this time, the HARQ-ACK codebook with priority index 0 and the HARQ-ACK codebook with priority index 1 need to be determined.

A DAI field in the downlink DCI scheduling the PDSCH reception with priority index 1, and/or indicating SPS PDSCH release, and/or indicating Scell dormancy can indicate the DAI information of the HARQ-ACK codebook with priority index 0, such as T-DAI. Specifically, N most significant bits (or least significant bits) of the DAI field in the downlink DCI scheduling the PDSCH reception with priority index 1, and/or indicating SPS PDSCH release, and/or indicating Scell dormancy are used to indicate the DAI information of HARQ-ACK codebook with priority index 0, such as T-DAI. The T-DAI can be the T-DAI of the PDSCH group g, and/or the T-DAI of the PDSCH group (g+1) mod 2, wherein g is equal to 0 or equal to 1. Alternatively, N1+N2 most significant bits (or least significant bits) of the DAI field in the downlink DCI scheduling the PDSCH reception with priority index 1, and/or indicating SPS PDSCH release, and/or indicating Scell dormancy are used to indicate the DAI information of the T-DAI of the PDSCH group g with priority index 0 (indicated by N1 bits, such as N1=2), such as T-DAI, and the DAI information of the PDSCH group (g+1) mod 2 (indicated by N2 bits, such as N2=2), such as T-DAI.

PDSCH group number field, and/or new feedback indicator field, and/or the field of the number of requested PDSCH groups in the downlink DCI scheduling the PDSCH reception with priority index 1, and/or indicating SPS PDSCH release, and/or indicating Scell dormancy can indicate the DAI information of the HARQ-ACK codebook with priority index 0, such as T-DAI. Specifically, one or multiple of the three fields can be used to indicate the DAI information of the HARQ-ACK codebook with priority index 0. The DAI information can be the DAI information of the PDSCH group g, and/or the DAI information of the PDSCH group (g+1) mod 2.

For each PDSCH group, the UE can determine a size of the HARQ-ACK codebook of the PDSCH group with priority index 0 according to DAI information of the PDSCH group with priority index 0 indicated by PDSCH group number field, and/or new feedback indicator field, and/or the number of requested PDSCH groups field, and/or the DAI field in the downlink DCI scheduling the PDSCH reception with priority index 1, and/or indicating SPS PDSCH release, and/or indicating Scell dormancy. Specifically, for the PDSCH group g of the HARQ-ACK codebook with priority index 0, the UE would set $V_{temp2}$ as T-DAI of HARQ-ACK codebook of PDSCH group g with priority index 0 indicated by the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1. For the PDSCH group (g+1) mod 2 of the HARQ-ACK codebook with priority index 0, the UE would set $V_{temp2}$ as T-DAI of HARQ-ACK codebook of PDSCH group (g+1) mod 2 with priority index 0 indicated by the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1.

This method specifies how to determine the HARQ-ACK codebooks of respective priorities when PUCCHs carrying HARQ-ACK information with different priorities need to be multiplexed in a PUCCH. By reusing the DAI field in the downlink DCI scheduling semi-static codebook, and/or PDSCH group number field, and/or new feedback indicator field, and/or the number of requested PDSCH group's field, the DAI information of the dynamic codebook with another priority is indicated. A consistent understanding of the size of the HARQ-ACK codebook between the base station and the UE is ensured, which improves the reliability of HARQ-ACK codebook transmission. This method indicates DAI information by reusing the existing DCI field, which reduces the DCI signaling overhead.

In a specific embodiment, the type of HARQ-ACK codebooks with different priorities can be different. The scenario in which the type of HARQ-ACK codebook with priority index 0 is enhanced dynamic codebook, such as 3GPP TS38.213 Type-2 codebook that supports grouping and HARQ-ACK retransmission, and the type of HARQ-ACK codebook with priority index 1 is semi-static codebook, such as 3GPP TS38.213 Type-1 codebook is taken as an example to describe how to determine the HARQ-ACK codebook with priority index 0 when multiplexing HARQ-ACK codebooks with different priorities. This method is also applicable to how to determine the HARQ-ACK codebook with priority index 1 when multiplexing HARQ-ACK codebooks with different priorities in the scenario in which the type of HARQ-ACK codebook with priority index 1 is enhanced dynamic codebook, such as 3GPP TS38.213 Type-2 codebook that supports grouping and HARQ-ACK retransmission, and the type of HARQ-ACK codebook with priority index 0 is semi-static codebook, such as 3GPP TS38.213 Type-1 codebook.

In this embodiment, at least one serving cell is configured for CBG retransmission.

The UE can multiplex the two HARQ-ACK codebooks in a PUCCH for transmission according to a predefined rule or higher layer signaling configuration or DCI dynamical indication. At this time, the HARQ-ACK codebook with priority index 0 and the HARQ-ACK codebook with priority index 1 need to be determined.

A DAI field in the downlink DCI scheduling the PDSCH reception with priority index 1, and/or indicating SPS PDSCH release, and/or indicating Scell dormancy can indicate the DAI information of the HARQ-ACK codebook with priority index 0, such as T-DAI. The DAI information can be the DAI information of the TB-level HARQ-ACK sub-codebook of PDSCH group 0 with priority index 0 (DAI information 1), and/or the DAI information of the CBG-level HARQ-ACK sub-codebook of PDSCH group 0 with priority index 0 (DAI information 2), and/or the DAI information of the TB-level HARQ-ACK sub-codebook of PDSCH group 1 with priority index 0 (DAI information 3), and/or the DAI information of the CBG-level HARQ-ACK sub-codebook of PDSCH group 1 with priority index 0 (DAI information 4).

A field, or bits in a field, or a combination of fields in DAI field in the downlink DCI scheduling the PDSCH reception with priority index 1, and/or indicating SPS PDSCH release, and/or indicating Scell dormancy, and/or PDSCH group number field, and/or new feedback indicator field, and/or the number of requested PDSCH groups field can be used to indicate one or more of DAI information 1, DAI information 2, DAI information 3 and DAI information 4.

For each HARQ-ACK sub-codebook of each PDSCH group, the UE can determine a size of the HARQ-ACK sub-codebook of the PDSCH group with priority index 0 according to the DAI information of the HARQ-ACK sub-codebook of the PDSCH group with priority index 0 indicated by DAI field in the downlink DCI scheduling the PDSCH reception with priority index 1, and/or indicating SPS PDSCH release, and/or indicating Scell dormancy, and/or PDSCH group number field, and/or new feedback indicator field, and/or the number of requested PDSCH groups field. Specifically, for example, for the TB-level HARQ-ACK sub-codebook of PDSCH group 0 of the HARQ-ACK codebook with priority index 0, the UE would set $V_{temp2}$ as the T-DAI of TB-level HARQ-ACK sub-codebook of PDSCH group 0 with priority index 0 indicated by the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1.

This method specifies how to determine the HARQ-ACK codebooks of respective priorities when PUCCHs carrying HARQ-ACK information with different priorities need to be multiplexed in a PUCCH. By reusing the DAI field in the downlink DCI scheduling semi-static codebook, and/or PDSCH group number field, and/or new feedback indicator field, and/or the number of requested PDSCH group's field, the DAI information of the dynamic codebook with another priority is indicated. A consistent understanding of the size of the HARQ-ACK codebook between the base station and the UE is ensured, which improves the reliability of HARQ-ACK codebook transmission. This method indicates DAI information by reusing the field in current DCI field, which reduces the DCI signaling overhead.

In a specific embodiment, the types of HARQ-ACK codebooks with different priorities can be the same, and they are all dynamic codebooks, for example, 3GPP TS38.213 Type-2 codebook. This embodiment specifically explains how to determine the HARQ-ACK codebook with priority index 0 and the HARQ-ACK codebook with priority index 1 when HARQ-ACK codebooks with different priorities are multiplexed.

In this embodiment, CBG retransmission is not configured.

The UE can multiplex two HARQ-ACK codebooks in a PUCCH for transmission according to a predefined rule or higher layer signaling configuration or DCI dynamical indication. At this time, the HARQ-ACK codebook with priority index 0 and the HARQ-ACK codebook with priority index 1 need to be determined.

A DAI field in the downlink DCI scheduling the PDSCH reception with priority index 1, and/or indicating SPS PDSCH release, and/or indicating Scell dormancy can indicate the DAI information of the HARQ-ACK codebook with priority index 0, such as T-DAI. The following methods can be used:

Method 1: adding N bits in the DCI to indicate the DAI information of the HARQ-ACK codebook with priority index 0, such as T-DAI.

Method 2: reusing the DAI field in the DCI or the N MSBs or the LSBs in the DAI field to indicate the DAI information of the HARQ-ACK codebook with priority index 0, such as T-DAI. The DAI domain can be a C-DAI field and/or a T-DAI field.

The UE can determine a size of the HARQ-ACK codebook with priority index 0 according to the DAI information of the HARQ-ACK codebook with priority index 0 indicated by DAI field in the downlink DCI scheduling the PDSCH reception with priority index 1, and/or indicating SPS PDSCH release, and/or indicating Scell dormancy. Specifically, for the HARQ-ACK codebook with priority index 0, the UE would set $V_{temp2}$ as the DAI information of the HARQ-ACK codebook with priority index 0 indicated by DAI field in the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1.

This method specifies how to determine the HARQ-ACK codebooks of respective priorities when PUCCHs carrying HARQ-ACK information with different priorities need to be multiplexed in a PUCCH. Method 1 and Method 2 indicate the DAI information of the dynamic codebook with another priority by adding a new DAI bit in the DCI. A consistent understanding of the size of the HARQ-ACK codebook between the base station and the UE is ensured, which improves the reliability of HARQ-ACK codebook transmission.

In a specific embodiment, the types of HARQ-ACK codebooks with different priorities can be the same, and they are all dynamic codebooks, for example, 3GPP TS38.213 Type-2 codebook. This implementation specifically explains how to determine the HARQ-ACK codebook with priority index 0 and the HARQ-ACK codebook with priority index 1 when HARQ-ACK codebooks with different priorities are multiplexed.

In this embodiment, at least one serving cell is configured with CBG retransmission.

The UE can multiplex two HARQ-ACK codebooks in a PUCCH for transmission according to a predefined rule or higher layer signaling configuration or DCI dynamical indication. At this time, the HARQ-ACK codebook with priority index 0 and the HARQ-ACK codebook with priority index 1 need to be determined.

A DAI field in the downlink DCI scheduling the PDSCH reception with priority index 1, and/or indicating SPS PDSCH release, and/or indicating Scell dormancy can indicate the DAI information of the HARQ-ACK codebook with priority index 0, such as T-DAI. The following methods can be used:

Method 1: adding N bits in the DCI to indicate the DAI information of the TB-level HARQ-ACK sub-codebook and the CBG-level HARQ-ACK sub-codebook with priority index 0, such as T-DAI. The DAI information of the TB-level HARQ-ACK sub-codebook with priority index 0 is equal to the DAI information of the CBG-level HARQ-ACK sub-codebook.

Method 2: adding N1+N2 bits in the DCI to indicate the DAI information of the TB-level HARQ-ACK sub-codebook and the CBG-level HARQ-ACK sub-codebook with priority index 0, such as T-DAI. The N1 bit is used to indicate the DAI information of the TB-level HARQ-ACK sub-codebook with priority index 0, and the N2 bit is used to indicate the DAI information of the CBG-level HARQ-ACK sub-codebook with priority index 0. N1 can be equal to N2.

Method 3: reusing the DAI field in the DCI or the N MSBs or the LSBs in the DAI field to indicate the DAI information of the TB-level HARQ-ACK sub-codebook and the CBG-level HARQ-ACK sub-codebook with priority index 0 with priority index 0, such as T-DAI. The DAI information of the TB-level HARQ-ACK sub-codebook with priority index 0 is equal to the DAI information of the CBG-level HARQ-ACK sub-codebook. The DAI field can be a C-DAI field and/or a T-DAI field.

Method 4: reusing the DAI field in the DCI or the N1+N2 most significant bits or the least significant bits in the DAI field to indicate the DAI information of the TB-level HARQ-ACK sub-codebook and the CBG-level HARQ-ACK sub-codebook with priority index 0 with priority index 0, such as T-DAI. The N1 bit is used to indicate the DAI information of the TB-level HARQ-ACK sub-codebook with priority index 0, and the N2 bit is used to indicate the DAI information of the CBG-level HARQ-ACK sub-codebook with priority index 0. N1 can be equal to N2. The DAI field can be a C-DAI field and/or a T-DAI field.

For a HARQ-ACK sub-codebook, the UE can determine a size of the HARQ-ACK sub-codebook with priority index 0 according to DAI information of the PDSCH group with priority index 0 indicated by the downlink DCI scheduling the PDSCH reception with priority index 1, and/or indicating SPS PDSCH release, and/or indicating Scell dormancy. Specifically, for the TB-level HARQ-ACK sub-codebook with priority index 0, the UE would set $V_{temp2}$ as the DAI information of the TB-level HARQ-ACK codebook with priority index 0 indicated by DAI field in the downlink DCI scheduling the PDSCH reception with priority index 1, and/or indicating SPS PDSCH release, and/or indicating Scell dormancy, after completing the c and m loops according to the pseudo-code of generating the HARQ-ACK codebook in 3GPP TS 38.213 9.1.3.1. For the CBG-level HARQ-ACK sub-codebook with priority index 0, the UE would set $V_{temp2}$ as the DAI information of the CBG-level HARQ-ACK codebook with priority index 0 indicated by DAI field in the downlink DCI scheduling the PDSCH reception with priority index 1, and/or indicating SPS PDSCH release, and/or indicating Scell dormancy after completing the c and m loops, according to the pseudo-code of generating the HARQ-ACK codebook in 3GPP TS 38.213 9.1.3.1.

This method specifies how to determine the HARQ-ACK codebook of respective priorities when PUCCHs carrying HARQ-ACK information with different priorities need to be multiplexed in a PUCCH. Method 1 indicates the DAI information of the dynamic codebook with another priority by adding a new DAI bit in the DCI. Method 2 indicates the DAI information of the dynamic codebook with another priority by reusing DAI field in the downlink DCI. Method 3 and Method 4 indicate the DAI information of the dynamic codebook with another priority by reusing DAI field in the downlink DCI. A consistent understanding of the size of the HARQ-ACK codebook between the base station and the UE is ensured, which improves the reliability of HARQ-ACK codebook transmission.

In a specific embodiment, the type of HARQ-ACK codebooks with different priorities can be different. The scenario in which the type of HARQ-ACK codebook with priority index 0 is dynamic codebook, such as 3GPP TS38.213 Type-2 codebook, and the type of HARQ-ACK codebook with priority index 1 is semi-static codebook, such as 3GPP TS38.213 Type-1 codebook is taken as an example to describe how to determine the HARQ-ACK codebook with priority index 0 when multiplexing HARQ-ACK codebooks with different priorities. This method is also applicable to how to determine the HARQ-ACK codebook with priority index 1 when multiplexing HARQ-ACK codebooks with different priorities in the scenario in which the type of HARQ-ACK codebook with priority index 1 is dynamic codebook, such as 3GPP TS38.213 Type-2 codebook, and the type of HARQ-ACK codebook with priority index 0 is semi-static codebook, such as 3GPP TS38.213 Type-1 codebook.

In this embodiment, no CBG retransmission is configured.

The UE can multiplex two HARQ-ACK codebooks in a PUCCH for transmission according to a predefined rule or higher layer signaling configuration or DCI dynamical indication. At this time, the HARQ-ACK codebook with priority index 0 and the HARQ-ACK codebook with priority index 1 need to be determined. If the PUCCH and a PUSCH satisfy certain condition(s), for example, there is overlap in time, the UCI information on the PUCCH can be multiplexed in the PUSCH for transmission. In this embodiment, a PUSCH with priority 1 scheduled by DCI is taken as an example to describe. The method in this embodiment is also applicable to a PUSCH with priority 0 scheduled by DCI.

The uplink DCI scheduling the PUSCH with priority index 1 can indicate the DAI information of the HARQ-ACK codebook with priority index 0. The number of bits in the DAI field of an uplink DCI format is not increased. Alternatively, the number of bits in the DAI field of an uplink DCI format is increased, for example, N1 bits. The DAI field in the uplink DCI scheduling the PUSCH with priority index 1 can indicate the DAI information of the HARQ-ACK codebook with priority index 0, such as T-DAI. Specifically, the N MSB or LSB of the DAI field in the uplink DCI scheduling the PUSCH with priority index 1 are used to indicate DAI information of the HARQ-ACK codebook with priority index 0, such as T-DAI. N can be equal to 2 or 1.

The UE can determine a size of the HARQ-ACK codebook with priority index 0 according to the DAI information of the HARQ-ACK codebook with priority index 0 indicated in the uplink DCI scheduling the PUSCH with priority index 1. Specifically, for the HARQ-ACK codebook with priority index 0, the UE would set $V_{temp2}$ as the DAI information of the HARQ-ACK sub-codebook with priority index 0 indicated by DAI field in the uplink DCI scheduling the PDSCH with priority index 1, after completing the c and m loops according to the pseudo-code of generating the HARQ-ACK codebook in 3GPP TS 38.213 9.1.3.1.

This method specifies how to determine the HARQ-ACK codebooks of respective priorities when HARQ-ACK information with different priorities need to be multiplexed in a PUCCH. The DAI information of another priority dynamic codebook is indicated by reusing the DAI field in the uplink DCI scheduling semi-static codebook. A consistent understanding of the size of the HARQ-ACK codebook between the base station and the UE is ensured, which improves the reliability of HARQ-ACK codebook transmission. This method indicates DAI information by reusing the field of current DCI field, which reduces the DCI signaling overhead.

In an embodiment, a value of the C-DAI field in the DCI format denotes the cumulative count of {serving cell, PDCCH monitoring occasion}-pair(s) in the DCI formats that present up to the current serving cell and current PDCCH monitoring occasion. The DCI format can schedule PDSCH reception or indicate SPS PDSCH release or indicate Scell dormancy. The C-DAI counting is in the following order: if the UE indicates that it supports receiving multiple downlink DCIs of the serving cell at one PDCCH monitoring occasion of one serving cell, first the same {serving cell, PDCCH monitoring occasion}-pair(s) are counted in ascending order according to the starting time of PDSCH reception, then in the ascending order of the serving cell index, and then in the ascending order of the PDCCH monitoring occasion index m, where 0≤m<M, and M is the number of elements in a set of the PDCCH monitoring occasions.

Since PDSCH reception is not scheduled by a DCI format indicating SPS PDSCH release or indicating Scell dormancy, for a DCI format indicating SPS PDSCH release or indicating Scell dormancy, the starting time of the corresponding PDSCH reception can be determined in the following methods.

Method 1: determining a virtual PDSCH reception according to the TDRA (time domain resource allocation) field indication of the DCI format indicating SPS PDSCH release or indicating Scell dormancy, and using the starting time of the virtual PDSCH reception as the starting time of PDSCH reception in the C-DAI calculation. For example, the C-DAI counting is in the following order: if the UE indicates that it supports receiving multiple downlink DCIs of the serving cell at one PDCCH monitoring occasion of one serving cell, first the same {serving cell, PDCCH monitoring occasion}-pairs are counted in ascending order according to the starting time indicated by the TDRA field in the DCI format, then in the ascending order of the serving cell index, and then in the ascending order of the PDCCH monitoring occasion index m, where 0≤m<M, and M is the number of elements in a set of the PDCCH monitoring occasion.

Method 2: it can be specified that the starting time of the PDSCH reception in the DCI format indicating SPS PDSCH release or indicating Scell dormancy is earlier than the starting time of the dynamically scheduled PDSCH reception. Alternatively, it can be specified that the starting time of the PDSCH reception in the DCI format indicating SPS PDSCH release or indicating Scell dormancy is later than the starting time of the dynamically scheduled PDSCH reception. It can be specified that the starting time of the PDSCH reception in the DCI format indicating SPS PDSCH release is earlier than the starting time of the PDSCH reception in DCI format indicating Scell dormancy. Alternatively, it can be specified that the starting time of the PDSCH reception in the DCI format indicating SPS PDSCH release is later than the starting time of the PDSCH reception in DCI format indicating Scell dormancy.

Method 3: it can be specified that the starting time of the PDSCH reception in the DCI format indicating SPS PDSCH release is the starting time of the SPS PDSCH with the smallest index among the released SPS PDSCHs. Alternatively, it can be specified that the starting time of the PDSCH reception in the DCI format indicating SPS PDSCH release is the starting time of the released SPS PDSCH. The starting time of the SPS PDSCH can be the starting time of the current SPS PDSCH, or the starting time of the last received SPS PDSCH, or the starting time of the next SPS PDSCH to be received. When the starting time of multiple PDSCH receptions in the DCI format indicating SPS PDSCH release are the same, the C-DAI in the DCI format can be sorted according to the order of the SPS PDSCH index released by this DCI format (if there are multiple indexes, take the minimum value) in ascending order or descending order.

It should be noted that the serving cell corresponding in the DCI format indicating Scell dormancy can be a primary serving cell.

This method clarifies the counting rule of C-DAI in the DCI format indicating SPS PDSCH release or indicating Scell dormancy. A consistent understanding of the C-DAI counting between the base station and the UE is ensured, which improves the reliability of HARQ-ACK codebook.

Embodiment 2

In step 201, the UE receives downlink data and/or downlink control signaling from a base station.

In step 202, the UE determines uplink data and/or uplink control signaling and an uplink time unit, an uplink physical channel and the power in which the second type of data and/or the second type of control signaling is transmitted based on the downlink data and/or downlink control signaling.

In step 203, the UE transmits the uplink data and/or the uplink control signaling to the base station with the determined power for transmitting the second type of data and/or the second type of control signaling, in the determined uplink time unit.

In some embodiments, the UE may be configured with two levels of priority for uplink transmission. For example, the two levels of priority may include a first priority and a second priority that are different from each other. In one example, the first priority may be higher than the second priority. However, the embodiments of the present disclosure are not limited thereto. For example, the UE may be configured with more than two levels of priority. For the sake of convenience, in the embodiments of the present disclosure, the description is made considering that the first priority is higher than the second priority.

In one example, the two levels of priorities may be indicated by priority numbers or priority indexes (e.g., priority index 1 and priority index 0). For example, a larger priority index may correspond to a higher priority, that is, a priority corresponding to priority index 1 may be higher than a priority corresponding to priority index 0. In this case, a larger priority index (e.g., priority index 1) may be a higher priority (e.g., the first priority), and a smaller priority index (e.g., priority index 0) may be a lower priority (e.g., the second priority). However, the embodiments of the present disclosure are not limited to this. For example, other priority indexes or indicators may be used to indicate the two levels of priorities. For the sake of convenience, in the embodiments of the present disclosure, description is made considering that a priority corresponding to a larger priority index (e.g., priority index 1) is higher than a priority corresponding to a smaller priority index (e.g., priority index 0). The present disclosure is not limited to the above manner. For example, priority index 1 may be used interchangeably with the first priority, the larger priority index or the higher priority, and priority index 0 may be used interchangeably with the second priority, the smaller priority index or the lower priority.

In some implementations, the two levels of priorities configured for the UE may be two physical layer priorities. For example, one of the two levels of priorities (the first priority (e.g., priority index 1) or the second priority (e.g., priority index 0)) may be provided for PUSCH or PUCCH. Specifically, a PUSCH or PUCCH transmission (including a transmission with repetitions if there is a transmission with repetitions) may be of (e.g., correspond to) priority index 0 or a larger priority index (e.g., priority index 1).

In an example, for a configured grant PUSCH transmission, the UE may determine the priority index according to a priority parameter (if configured). For a PUCCH transmission with HARQ-ACK information corresponding to an SPS PDSCH reception or an SPS PDSCH release, the UE may determine the priority index of the PUCCH transmission from a parameter of HARQ-CodebookID (if configured). If no priority index is configured for a certain PUSCH or PUCCH transmission of the UE, the priority index of the PUSCH or PUCCH transmission may be 0.

In an example, if the UE monitors a PDCCH to detect DCI format 0_1 and DCI format 1_1 or to detect DCI format 0_2 and DCI format 1_2 in an active DL BWP, the priority index may be provided by a priority indicator field. If the UE indicates that it has the capability to monitor the PDCCH in the active DL BWP to detect DCI format 0_1 and DCI format 1_1 and to detect DCI format 0_2 and DCI format 1_2, DCI format 0_1 or DCI format 0_2 may schedule a PUSCH transmission with any priority, and DCI format 1_1 or DCI format 1_2 may schedule a PDSCH reception and trigger a PUCCH transmission of corresponding HARQ-ACK information with any priority.

In an example, the UE may be configured with a PUCCH configuration list, which may contain two PUCCH configurations, including a first PUCCH configuration and a second PUCCH configuration. For example, the first PUCCH configuration may correspond to the second priority (e.g., the smaller priority index (e.g., priority index 0)), that is, the priority of the first PUCCH configuration may be the second priority (e.g., the smaller priority index (e.g., priority index 0)). Also, the second PUCCH configuration may correspond to the first priority (e.g., the larger priority index (e.g., priority index 1)), and the priority of the second PUCCH configuration may be the first priority (e.g., the larger priority index (e.g., priority index 1)).

For example, a sub-slot configuration length of each PUCCH configuration of the first PUCCH configuration and the second PUCCH configuration may be 7 OFDM symbols or 2 OFDM symbols. Sub-slot configuration lengths of different PUCCH configurations may be configured separately.

In some embodiments, the UE may be configured with a pdsch-HARQ-ACK-CodebookList. For example, the pdsch-HARQ-ACK-CodebookList may contain two pdsch-HARQ-ACK-Codebook configurations, corresponding respectively to a first HARQ-ACK codebook and a second HARQ-ACK codebook. For example, the first HARQ-ACK codebook is associated with a PUCCH with the smaller priority index (e.g., priority index 0), and the second HARQ-ACK codebook is associated with a PUCCH with the larger priority index (e.g., priority index 1). In this case, the priority of the first HARQ-ACK codebook may be the second priority (e.g., the smaller priority index (e.g., priority index 0)), and the priority of the second HARQ-ACK codebook may be the first priority (e.g., the larger priority index (e.g., priority index 1)).

In some implementations, the first priority or higher priority (e.g., the larger priority index (e.g., priority index 1)) may correspond to a first service (e.g., a URLLC service), and the second priority or lower priority (e.g., the smaller priority index (e.g., priority index 0)) may correspond to a second service (e.g., an eMBB service).

According to an embodiment of the present disclosure, UCI(s) with different priority indexes are multiplexed in a same PUCCH for transmission, and thus how to determine the PUCCH transmit power is a problem to be solved.

In this embodiment, UCI(s) with different priority indexes can use different code rates, or UCI(s) with different priority indexes can use a same code rate with a uniform coding.

If a UE transmits a PUCCH on an active UL BWP b of carrier f of a primary serving cell c using PUCCH power control adjustment state with index l, the UE determines the PUCCH transmit power $P_{PUCCH,b,f,c}(i, q_u, q_d, l)$ in PUCCH transmission occasion i as $$P_{PUCCH,b,f,c}(i, q_u, q_d, l) =$$

$$\min\left\{\begin{array}{l} P_{CMAX,f,c}(i), \\ P_{O\_PUCCH,b,f,c}(q_u) + 10\log_{10}(2^{\mu} \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{array}\right\}$$

[dBm (decible relative to one milliwatt)]

where, $P_{CMAX,f,c}(i)$ is the configured maximum output power for carrier f of primary serving cell c in the PUCCH transmission occasion i.

$P_{O\_PUCCH,b,f,c}(q_u)$ is an open-loop power parameter. For example, it can be determined in a manner as specified in 3GPP TS 38.213.

$M_{RB,b,f,c}^{PUCCH}(i)$ is the bandwidth of the PUCCH for PUCCH transmission occasion i on the active UL BWP b of carrier f of serving cell c, with the unit of resource block (RB). It is to be noted that the sub-carrier spacing of the BWP b is $\mu$.

$PL_{b,f,c}(q_d)$ is a pathloss related parameter. For example, it can be determined in a manner as specified in 3GPP TS 38.213.

$\Delta_{F\_PUCCH}(F)$ is a PUCCH format related parameter. For example, it can be determined in a manner as specified in 3GPP TS 38.213.

$g_{b,f,c}(i, l)$ is a closed loop power parameter. For example, it can be determined in a manner as specified in 3GPP TS 38.213.

$\Delta_{TB,b,f,c}(i)$ is a PUCCH transmit power adjustment component on active UL BWP b of carrier f of primary cell c in the PUCCH transmission occasion i, For PUCCH format 0 or PUCCH format 1, $\Delta_{TB,b,f,c}(i)$ can be determined in a manner as specified in 3GPP TS 38.213.

For PUCCH format 2, PUCCH format 3 and PUCCH format 4 and for the number of UCI bits less than or equal to 11, $\Delta_{TB,b,f,c}(i)=10 \log_{10}(K_1 \cdot (n_{HARQ-ACK}(i) + O_{SR}(i) + O_{CSI}(i)/N_{RB}(i))$, where $K_1 = 6$ $n_{HARQ-ACK}(i)$ is the number of HARQ-ACK information bits used for power control, for example, $n_{HARQ-ACK}(i)$ can be the sum of the number of HARQ-ACK information bits used for power control for HARQ-ACK codebooks with different priority indexes. The number of HARQ-ACK information bits used for power control for HARQ-ACK codebook with a priority index can be determined according to pdsch-HARQ-ACK-Codebook parameter configuration in a manner as specified in 3GPP TS 38.213, for example. For a priority index, if the UE is not configured with parameter pdsch-HARQ-ACK-Codebook, when there is HARQ-ACK information, the number of HARQ-ACK information bits used for power control is 1, otherwise it is 0. It is to be noted that if the HARQ-ACK information only includes one HARQ-ACK codebook, $n_{HARQ-ACK}(i)$ can be the number of HARQ-ACK information bits used for power control for the HARQ-ACK codebook.

$O_{SR}(i)$ is the number of SR and/or LRR information bits, for example, $O_{SR}(i)$ can be the sum of the number of SR and/or LRR information bits with different priority indexes. Or $O_{SR}(i)$ can be the number of SR and/or LRR information bits with a larger priority index (for example, priority index 1). Or $O_{SR}(i)$ can be the number of SR and/or LRR information bits with a smaller priority index (for example, priority index 0). For example, the number of SR and/or LRR information bits with a priority index can be determined in a manner as specified in [9.2.5.1], 3GPP TS 38.213.

$O_{CSI}(i)$ is the number of CSI information bits, for example, $O_{CSI}(i)$ may be the sum of the number of CSI information bits with different priority indexes. Or $O_{CSI}(i)$ can be the number of CSI information bits with a larger priority index (for example, priority index 1). Or $O_{CSI}(i)$ can be the number of CSI information bits with a smaller priority index (for example, priority index 0). For example, the number of CSI information bits with a priority index can be determined in a manner as specified in [9.2.5.2], 3GPP TS 38.213.

$N_{RE}(i)$ is the number of REs (resource elements) for UCI transmission. $N_{RE}(i) = M_{RB,b,f,c}^{PUCCH}(i) \cdot N_{sc,ctrl}^{RB}(i) \cdot N_{symbUCI,b,f,c}^{PUCCH}(i)$ where $N_{sc,ctrl}^{RB}(i)$ is the number of subcarriers per RB excluding subcarriers used for demodulation reference signal (DMRS), and $N_{symbUCI,b,f,c}^{PUCCH}(i)$ is the number of OFDM symbols excluding symbols used for DMRS.

For PUCCH format 2, PUCCH format 3 and PUCCH format 4 and for the number of UCI bits larger than 11, $\Delta_{TF,b,f,c}(i) = 10 \log_{10}(2^{K_2 \cdot BPRE(i)} - 1)$, where $K_2 = 2.4$
$BPRE(i) = (O_{ACK}(i) + O_{SR}(i) + O_{CSI}(i) + O_{CRC}(i))/N_{RE}(i)$ $O_{ACK}(i)$ is the number of HARQ-ACK codebook information bits, for example, $O_{ACK}(i)$ can be sum of the number of HARQ-ACK codebook information bits with different priority indexes. The number of HARQ-ACK codebook information bits with a priority index can be determined according to pdsch-HARQ-ACK-Codebook parameter configuration in a manner as specified in 3GPP TS 38.213, for example. For a priority index, if the UE is not configured with parameter pdsch-HARQ-ACK-Codebook, when there is HARQ-ACK information, the number of HARQ-ACK information bits used for power control is 1, otherwise it is 0. It should be noted that if HARQ-ACK information only includes one HARQ-ACK codebook, $O_{ACK}(i)$ can be the number of HARQ-ACK information bits used for power control for this HARQ-ACK codebook.

$O_{SR}(i)$ is the number of SR and/or LRR information bits, for example, $O_{SR}(i)$ can be the sum of the number of SR and/or LRR information bits with different priority indexes. Or $O_{SR}(i)$ may be the number of SR and/or LRR information bits with a larger priority index (for example, priority index 1). Or $O_{SR}(i)$ can be the number of SR and/or LRR information bits with a smaller priority index (for example, priority index 0). For example, the number of SR and/or LRR information bits with a priority index can be determined in a manner as specified in [9.2.5.1], 3GPP TS 38.213.

$O_{CSI}(i)$ is the number of CSI information bits, for example, $O_{CSI}(i)$ can be the sum of the number of CSI information bits with different priority indexes. Or $O_{CSI}(i)$ can be the number of CSI information bits with a larger priority index (for example, priority index 1). Or $O_{CSI}(i)$ can be the number of CSI information bits with a smaller priority index (for example, priority index 0). For example, the number of CSI information bits with a priority index can be determined in a manner as specified in [9.2.5.2], 3GPP TS 38.213.

$O_{CRC}(i)$ is the number of CRC bits, for example, $O_{CSI}(i)$ can be the sum of the number of CRC bits with different priority indexes.

$N_{RE}(i)$ is the number of REs for UCI transmission. $N_{RE} = M_{RB,b,f,c}^{PUCCH}(i) \cdot N_{sc,ctrl}^{RB}(i) \cdot N_{symbUCI,b,f,c}^{PUCCH}(i)$ where $N_{sc,ctrl}^{RB}(i)$ is the number of subcarriers per RB excluding subcarriers used for DMRS, and $N_{symbUCI,b,f,c}^{PUCCH}(i)$ is the number of OFDM symbols excluding symbols used for DMRS.

If $P_{O\_PUCCH,b,f,c}(q_u) + 10 \log_{10}(2^\mu \cdot M_{RB,b,f,c}^{PUCCH}(i)) \cdot PL_{b,f,c}(q_d) + \Delta_{F\_PUCCH}(F) + \Delta_{TF,b,f,c}(i) + g_{b,f,c}(i, 1)$ is larger than $P_{CMAX,f,c}(i)$, only UCI(s) with a larger priority index (for example, priority index 1) will be transmitted without transmitting UCI(s) with a smaller priority index (for example, priority index 0). Or, only the UCI(s) with a larger priority index (for example, priority index 1) and part of the UCI(s) with a smaller priority index (for example, priority index 0) will be transmitted without transmitting other parts of UCI(s) with a smaller priority index (for example, priority index 0), where the part of UCI(s) with a smaller priority index can be HARQ-ACK and/or SR and/or LRR, and the other part of the UCI(s) with a smaller priority index may be CSI. Whether to transmit the part of the UCI(s) with a smaller priority index can be determined based on $P_{O\_PUCCH,b,f,c}(q_u) + 10 \log_{10}(2\mu \cdot M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i, 1)$ calculated with the UCI(s) with a larger priority index (for example, priority index 1) and the part of the UCI(s) with a smaller priority index (for example, priority index 0): if the value is less than or equal to, $P_{CMAX,f,c}(i)$, the part of the UCI(s) with a smaller priority index will be transmitted; otherwise, the UCI(s) with a smaller priority index will not be transmitted.

If $P_{O\_PUCCH,b,f,c}(q_u) + 10 \log_{10}(2\mu \cdot M_{RB,b,f,c}(i)) + PL_{b,f,c}(q_d) + \Delta_{F\_PUCCH}(F) + \Delta_{TF,b,f,c}(i) + g_{b,f,c}(i, 1)$ is greater than or equal to, $P_{CMAX,f,c}(i) + \Delta$, only the UCI(s) with a larger priority index (for example, priority index 1) will be transmitted without transmitting the UCI(s) with a smaller priority index (for example, priority index 0). Or, only the UCI(s) with a larger priority index and part of the UCI(s) with a smaller priority index will be transmitted without transmitting other part of the UCI(s) with a smaller priority index, where the part of the UCI(s) with a smaller priority index may be HARQ-ACK and/or SR and/or LRR, and the other part of the UCI(s) with a smaller priority index may be CSI. Where $\Delta$ is a parameter greater than 0. Whether to transmit the part of the UCI(s) with a smaller priority index (for example, priority index 0) can be determined based on $P_{O\_PUCCH,b,f,c}(q_u) + 10 \log_{10}(2\mu \cdot M_{RB,b,f,c}^{PUCCH}(i)) + PL_{b,f,c}(q_d) + \Delta_{F\_PUCCH}(F) + \Delta_{TF,b,f,c}(i) + g_{b,f,c}(i, 1)$ calculated with UCI(s) with a larger priority index (for example, priority index 1) and the part of UCI(s) with a smaller priority index (for example, priority index 0): if the value is less than or equal to, $P_{CMAX,f,c}(i)$, the part of the UCI(s) with a smaller priority index (for example, priority index 0) will be transmitted; otherwise, the UCI(s) with a smaller priority index will not be transmitted.

This method defines a power calculation method used when different priority indexes are multiplexed in a PUCCH for transmission, which can improve the reliability of PUCCH transmission by determining the power through total UCI(s). When the power is limited, a method is defined to ensure the reliability of UCI with higher priority, which can improve the reliability of transmission of UCI with higher priority. The flexibility of scheduling can be increased through parameter configuration in which UCI(s)

with lower priority are transmitted as much as possible under the premise of ensuring the reliability of transmission of UCI(s) with higher priority.

According to an embodiment, UCI(s) with different priority indexes are multiplexed in a same PUCCH for transmission, wherein the UCI(s) use different code rates. How to determine the PUCCH transmit power is a problem to be resolved.

If a UE transmits a PUCCH on an active UL BWP b of carrier f of a primary serving cell c using PUCCH power control adjustment state with index l, the UE determines the PUCCH transmit power $P_{PUCCH,b,f,c}(i, q_u, q_d, l)$ in PUCCH transmission occasion i as $$P_{PUCCH,b,f,c}(i, q_u, q_d, l) = \min \left\{ \begin{array}{l} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{array} \right\} [dBm]$$

where, $P_{CMAX,f,c}(i)$ is the configured maximum output power for the carrier f of the primary serving cell c in the PUCCH transmission occasion i.

$P_{O\_PUCCH,b,f,c}(q_u)$ is an open-loop power parameter. For example, it can be determined in a manner as specified in 3GPP TS 38.213.

$M_{RB,b,f,c}^{PUCCH}(i)$ is the bandwidth of the PUCCH for PUCCH transmission occasion i on the active UL BWP b of carrier f of serving cell c, with the unit of RB. It is to be noted that the sub-carrier spacing of the BWP b is μ.

$PL_{b,f,c}(q_d)$ is a pathloss related parameter. For example, it can be determined in a manner as specified in 3GPP TS 38.213.

$\Delta_{F\_PUCCH}(F)$ is a PUCCH format related parameter. For example, it can be determined in a manner as specified in 3GPP TS 38.213.

$g_{b,f,c}(i, l)$ is a closed loop power parameter. For example, it can be determined in a manner as specified in 3GPP TS 38.213.

$\Delta_{TF,b,f,c}(i)$ is a PUCCH transmit power adjustment component on the active UL BWP b of carrier f of primary cell c in the PUCCH transmission occasion i, For PUCCH format 0 or PUCCH format 1, $\Delta_{TF,b,f,c}(i)$ can be determined in a manner as specified in 3GPP TS 38.213.

For PUCCH format 2, PUCCH format 3 and PUCCH format 4 and for the number of UCI bits with a larger priority index (for example, priority index 1) less than or equal to 11, $\Delta_{TF,b,f,c}(i)=10 \log_{10}(K_1 \cdot (n_{HARQ-ACK}(i)+O_{SR}(i)+O_{CSI}(i))/N_{RE}(i))$, where $K_1=6$ $n_{HARQ-ACK}(i)$ is the number of HARQ-ACK information bits used for power control. $n_{HARQ-ACK}$ can be the number of HARQ-ACK information bits used for power control for HARQ-ACK codebook with a larger priority index (for example, priority index 1). The number of HARQ-ACK information bits used for power control for HARQ-ACK codebook with a priority index can be determined according to pdsch-HARQ-ACK-Codebook parameter configuration in a manner as specified in 3GPP TS 38.213, for example. For a priority index, if the UE is not configured with parameter pdsch-HARQ-ACK-Codebook, when there is HARQ-ACK information, the number of HARQ-ACK information bits used for power control is 1, otherwise it is 0.

$O_{SR}(i)$ is the number of SR and/or LRR information bits. $O_{SR}(i)$ can be the number of SR and/or LRR information bits with a larger priority index (for example, priority index 1). For example, the number of SR and/or LRR information bits with a priority index can be determined in a manner as specified in [9.2.5.1], 3GPP TS38.213.

$O_{CSI}(i)$ is the number of CSI information bits. $O_{CSI}(i)$ can be the number of CSI information bits with a larger priority index (for example, priority index 1). For example, the number of CSI information bits with a larger priority index can be determined in a manner as specified in [9.2.5.2], 3GPP TS 38.213.

$N_{RE}(i)$ is the number of REs for transmitting UCI(s) with a larger priority index (for example, priority index 1).

For PUCCH format 2, PUCCH format 3 and PUCCH format 4 and for the number of UCI bits larger than 11, $\Delta_{TF,b,f,c}(i)=10 \log_{10}(2^{K_2 \cdot BPRE(i)}-1)$, where $O_{ACK}(i)$ is the number of HARQ-ACK codebook information bits. $O_{ACK}(i)$ can be the number of HARQ-ACK codebook information bits with a larger priority index (for example, priority index 1). The number of HARQ-ACK codebook information bits with a priority index can be determined according to pdsch-HARQ-ACK-Codebook parameter configuration in a manner as specified in 3GPP TS 38.213, for example. For a priority index, if the UE is not configured with the parameter pdsch-HARQ-ACK-Codebook, when there is HARQ-ACK information, the number of HARQ-ACK information bits used for power control is 1, otherwise it is 0.

$O_{SR}(i)$ is the number of SR and/or LRR information bits. $O_{SR}(i)$ can be the number of SR and/or LRR information bits with a larger priority index (for example, priority index 1). For example, the number of SR and/or LRR information bits with a priority index can be determined in a manner as specified in [9.2.5.1], 3GPP TS 38.213.

$O_{CSI}(i)$ is the number of CSI information bits. $O_{CSI}(i)$ can be the number of CSI information bits with a larger priority index (for example, priority index 1). For example, the number of CSI information bits with a priority index can be determined in a manner as specified in [9.2.5.2], 3GPP TS 38.213.

$O_{CRC}(i)$ is the number of CRC bits, for example, $O_{CRC}(i)$ can be the number of CRC bits with a larger priority index (for example, priority index 1).

$N_{RE}(i)$ is the number of REs for transmitting UCI(s) with a larger priority index (for example, priority index 1).

If $P_{O\_PUCCH,b,f,c}(q_u)+10 \log_{10}(2\mu \cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i, l)$ is greater than $P_{CMAX,f,c}(i)$, only UCI(s) with a larger priority index (for example, priority index 1) will be transmitted without transmitting UCI(s) with a smaller priority index (for example, priority index 0). Or, only the UCI(s) with a larger priority index and part of the UCI(s) with a smaller priority index will be transmitted without transmitting other part of the UCI(s) with a smaller priority index, where the part of the UCI(s) with a smaller priority index can be HARQ-ACK and/or SR and/or LRR, and the other part of the UCI(s) with a smaller priority index can be CSI. Whether to transmit the part of the UCI(s) with a smaller priority index can be determined based on $P_{O\_PUCCH,b,f,c}(q_u)+10 \log_{10}(2^\mu \cdot M_{RB,b,f,c}^{PUCCH}(i)))+PL_{b,f,c}(q_d)+\Delta_{F\_PUCCH}(F)+\Delta_{TF,b,f,c}(i)+g_{b,f,c}(i, 1)$ calculated with the UCI(s) with a larger priority index (for example, priority index 1) and the part of the UCI(s) with a smaller priority index (for example, priority index 0): if the value is less than or equal to, $P_{CMAX,f,c}(i)$, the part of the UCI(s) with a smaller priority index will be transmitted; otherwise, the UCI(s) with a smaller priority index will not be transmitted.

If $P_{O\_PUCCH,b,f,c}(q_u)+10 \log_{10}(2\mu \cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i, 1)$ is greater than or equal to, $P_{CMAX,f,c}(i)+\Delta$, only the UCI(s) with a larger priority index (for example, priority index 1) will be transmitted without transmitting the UCI(s) with a smaller priority index (for example, priority index 0). Or, only the UCI(s) with a larger priority index (for example, priority index 1) and part of the UCI (s) with a smaller priority index (for example, priority index 0) will be transmitted without transmitting other part of the UCI(s) with a smaller priority index, where the part of the UCI(s) with a smaller priority index can be HARQ-ACK and/or SR and/or LRR, and the other part of the UCI(s) with a smaller priority index can be CSI. Where $\Delta$ is a parameter larger than 0. Whether to transmit the part of the UCI(s) with a smaller priority index can be determined based on $P_{O\_PUCCH,b,f,c}(q_u)+10 \log_{10}(2\mu \cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i, 1)$ calculated with the UCI(s) with a larger priority index and the part of the UCI(s) with a smaller priority index: if the value is less than or equal to, $P_{CMAX,f,c}(i)$, the part of the UCI(s) with a smaller priority index will be transmitted; otherwise, the UCI(s) with a smaller priority index will not be transmitted.

It is to be noted that when calculating $\Delta_{TF,b,f,c}(i)$, $\Delta_{TF,b,f,c}(i)$ can be calculated separately according to UCI(s) with different priorities, and then the maximum value or minimum value thereof can be further taken to determine the PUCCH transmit power.

This method defines a power calculation method used when different priority indexes are multiplexed in a PUCCH for transmission, which can improve the reliability of PUCCH transmission by determining the power through UCI(s) with higher priority. When the power is limited, a method is defined to ensure the reliability of UCI(s) with higher priority, which can improve the reliability of transmission of UCI(s) with higher priority. The flexibility of scheduling can be increased through parameter configuration in which UCI(s) with lower priority are transmitted as much as possible under the premise of ensuring the reliability of transmission of UCI(s) with higher priority.

According to an embodiment, UCI(s) with a priority index are multiplexed in a same PUCCH for transmission, wherein the UCI(s) comprise two parts of CSI, namely Part 1 CSI and Part 2 CSI. How to determine the PUCCH transmit power is a problem to be resolved.

If a UE transmits a PUCCH on an active UL BWP b of carrier f of a primary serving cell c using PUCCH power control adjustment state with index l, the UE determines the PUCCH transmit power $P_{PUCCH,b,f,c}(i, q_u, q_d, l)$ in PUCCH transmission occasion i as $$P_{PUCCH,b,f,c}(i, q_u, q_d, l) = \min \begin{Bmatrix} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i, l) \end{Bmatrix} [dBm]$$

where, $P_{CMAX,f,c}(i)$ is the configured maximum output power for the carrier f of primary serving cell c in the PUCCH transmission occasion i.

$P_{O\_PUCCH,b,f,c}(q_u)$ is an open-loop power parameter. For example, it can be determined in a manner as specified in 3GPP TS 38.213.

$M_{RB,b,f,c}^{PUCCH}(i)$ is the bandwidth of the PUCCH for PUCCH transmission occasion i on the active UL BWP b of carrier f of serving cell c, with the unit of RB. It is to be noted that the sub-carrier spacing of the BWP b is $\mu$.

$PL_{b,f,c}(q_d)$ is a pathloss related parameter. For example, it can be determined in a manner as specified in 3GPP TS 38.213.

$\Delta_{F\_PUCCH}(F)$ is a PUCCH format related parameter. For example, it can be determined in a manner as specified in 3GPP TS 38.213.

$g_{b,f,c}(i, l)$ is a closed loop power parameter. For example, it can be determined in a manner as specified in 3GPP TS 38.213.

$\Delta_{TF,b,f,c}(i)$ is a PUCCH transmit power adjustment component on the active UL BWP b of carrier f of primary cell c in the PUCCH transmission occasion i, For PUCCH format 2, PUCCH format 3 and PUCCH format 4 and for the number of UCI bits excluding Part 2 CSI less than or equal to 11, $\Delta_{TF,b,f,c}(i)=10 \log_{10}(K_1 \cdot (n_{HARQ-ACK}(i)+O_{SR}(i)+O_{CSI}(i))/N_{RE}(i)$, where $K_1=6$ $n_{HARQ-ACK}(i)$ is the number of HARQ-ACK information bits used for power control. The number of HARQ-ACK information bits used for power control for HARQ-ACK codebook can be determined according to pdsch-HARQ-ACK-Codebook parameter configuration in a manner as specified in 3GPP TS 38.213, for example. If the UE is not configured with parameter pdsch-HARQ-ACK-Codebook, when there is HARQ-ACK information, the number of HARQ-ACK information bits used for power control is 1, otherwise it is 0.

$O_{SR}(i)$ is the number of SR and/or LRR information bits. For example, the number of SR and/or LRR information bits can be determined in a manner as specified in [9.2.5.1], 3GPP TS 38.213.

$O_{CSI}(i)$ is the number of information bits of Part 1 CSI. For example, it can be determined in a manner as specified in [9.2.5.2], 3GPP TS 38.213.

$N_{RE}(i)$ is the number of REs for transmitting the UCI(s) excluding Part 2 CSI.

For PUCCH format 2, PUCCH format 3 and PUCCH format 4 and for the number of UCI bits excluding Part 2 CSI greater than 11, $\Delta_{TF,b,f,c}(i)=10 \log_{10}(2^{K_2 \cdot BPRE(i)}-1)$, where $K_2=2.4$ $BPRE(i)=(O_{ACK}(i)+O_{SR}(i)+O_{CSI}(i)+O_{CRC}(i))/N_{RE}(i)$ $O_{ACK}(i)$ is the number of HARQ-ACK codebook information bits. The number of HARQ-ACK codebook information bits can be determined according to pdsch-HARQ-ACK-Codebook parameter configuration in a manner as specified in 3GPP TS 38.213, for example. For a priority index, if the UE is not configured with the parameter pdsch-HARQ-ACK-Codebook, when there is HARQ-ACK information, the number of HARQ-ACK information bits used for power control is 1, otherwise it is 0.

$O_{SR}(i)$ is the number of SR and/or LRR information bits. For example, the number of SR and/or LRR information bits can be determined in a manner as specified in [9.2.5.1], 3GPP TS 38.213.

$O_{CSI}(i)$ is the number of Part 1 CSI information bits. For example, it can be determined in a manner as specified in [9.2.5.2], 3GPP TS 38.213.

$O_{CRC}(i)$ is the number of CRC bits for HARQ-ACK, and/or SR, and/or Part 1 CSI.

$N_{RE}(i)$ is the number of REs for transmitting the UCI(s) excluding Part 2 CSI.

If $P_{O\_PUCCH,b,f,c}(q_u)+10\ \log_{10}(2^\mu \cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i,\ 1)$ is greater than $P_{CMAX,f,c}(i)$ only the UCI(s) excluding Part 2 CSI will be transmitted without transmitting Part 2 CSI.

If $P_{O\_PUCCH,b,f,c}(q_u)+10\ \log_{10}(2^\mu \cdot M_{RB,b,f,c}^{PUCCH}(i))+PL_{b,f,c}(q_d)+\Delta_{F\_PUCCH}(F)+\Delta_{TF,b,f,c}(i)+g_{b,f,c}(i,\ 1)$ is greater than or equal to, $P_{CMAX,f,c}(i)+\Delta$, only the UCI(s) excluding Part 2 CSI will be transmitted without transmitting Part 2 CSI.

It is to be noted that when calculating $\Delta_{TF,b,f,c}(i)$, $\Delta_{TF,b,f,c}$ can be calculated separately according to the UCI(s) excluding Part 2 CSI, and Part 2 CSI, and then the maximum value or minimum value thereof can be further taken to determine the PUCCH transmit power.

This method defines a power calculation method used when PUCCH contains two parts of CSI for PUCCH transmission, which can improve the reliability of transmission of UCI(s) with higher priority by determining the power through UCI(s) with higher priority, i.e., UCI(s) excluding Part 2 CSI. When the power is limited, a method is defined to ensure the reliability of UCI(s) with higher priority, which can improve the reliability of transmission of UCI(s) with higher priority. The flexibility of scheduling can be increased through parameter configuration in which UCI(s) with lower priority are transmitted as much as possible under the premise of ensuring the reliability of transmission of UCI(s) with higher priority.

According to an embodiment, for single cell operation with two uplink carriers or for operation with carrier aggregation (CA), the sum of the power calculated separately by UE on each carrier and uplink cell would exceed the configured total UE transmit power. At this time, the UE should, according to transmission priority, prioritize the allocation of transmissions with higher priority, and reduce the power of transmissions with lower priority, so as to ensure that the sum of the power does not exceed the configured total transmit power. When multiplexing UCI(s) and/or data with different priority indexes, how to sort the priorities of different channels is a problem to be resolved.

In this embodiment, priority indexes with 2 levels are taken as an example to illustrate the rules for sorting the priorities of different channels. This embodiment can also be used in a scenario where the priority indexes are more than 2.

The UE can be configured with a PUCCH configuration list, and the PUCCH configuration list can include two PUCCH configurations. The priority of the first PUCCH configuration can be the smaller priority index (for example, priority index 0). The priority of the second PUCCH configuration can be the larger priority index (for example, priority index 1).

The power allocated by the UE for PUSCH/PUCCH/PRACH (physical random access channel)/SRS (sounding reference signal) transmission is sorted from high to low in the following order to ensure that the total power is less than or equal to the maximum transmit power.

PRACH transmission on the primary serving cell.

PUSCH transmission with HARQ-ACK information with a larger priority index (for example, priority index 1), or PUCCH transmission with HARQ-ACK information, and/or SR, and/or LRR with a larger priority index. It is to be noted that the PUSCH can be a PUSCH with a smaller priority index (for example, priority index 0) or a PUSCH with a larger priority index, and the PUCCH can be a PUCCH with a smaller priority index or a PUCCH with a larger priority index.

PUSCH transmission with CSI with a larger priority index (for example, priority index 1) or PUCCH transmission with CSI with a larger priority index. It is to be noted that the PUSCH can be a PUSCH with a smaller priority index (for example, priority index 0) or a PUSCH with a larger priority index, and the PUCCH can be a PUCCH with a smaller priority index or a PUCCH with a larger priority index.

PUSCH transmission with a larger priority index (for example, priority index 1) without HARQ-ACK information or CSI with a larger priority index. The priorities of PUSCHs can be further distinguished according to whether they include HARQ-ACK information or CSI with a smaller priority index (for example, priority index 0). For example, a PUSCH transmission with a larger priority index with HARQ-ACK information and/or CSI with a smaller priority index is of higher priority than a PUSCH transmission with a larger priority index without HARQ-ACK information and/or CSI with a smaller priority index. Or, a PUSCH transmission with a larger priority index with HARQ-ACK information and/or CSI with a smaller priority index is of a lower priority than a PUSCH transmission with a larger priority index without HARQ-ACK information and/or CSI with a smaller priority index. For Type-2 random access procedure, a PUSCH transmission with a larger priority index on primary serving cell is of the same priority as a PUSCH transmission with a larger priority index without HARQ-ACK information or CSI with a larger priority index. Or, for Type-2 random access procedure, a PUSCH transmission with a larger priority index on primary serving cell is of the same priority as a PUSCH transmission with a larger priority index without HARQ-ACK information or CSI with a larger priority index but with HARQ-ACK information and/or CSI with a smaller priority index. Or, for Type-2 random access procedure, a PUSCH transmission with a larger priority index on primary serving cell is of the same priority as a PUSCH transmission with a larger priority index without HARQ-ACK information or CSI with a larger priority index and without HARQ-ACK information and/or CSI with a smaller priority index.

PUSCH transmission with a smaller priority index (for example, priority index 0) without HARQ-ACK information or CSI with a larger priority index (for example, priority index 1), and/or PUCCH transmission with a smaller priority index without HARQ-ACK information or CSI or SR or LRR with a larger priority index.

PUCCH transmission with a smaller priority index (for example, priority index 0) with HARQ-ACK information, and/or SR, and/or LRR with a smaller priority index, or PUSCH transmission with a smaller priority index with HARQ-ACK information with a smaller priority index.

PUCCH transmission with a smaller priority index (for example, priority index 0) with CSI with a smaller priority index, and/or PUSCH transmission with a smaller priority index with CSI with a smaller priority index.

PUSCH transmission with a smaller priority index (for example, priority index 0) without HARQ-ACK information or CSI with a smaller priority index, for Type-2 random access procedure, PUSCH transmission with a smaller priority index on primary serving cell.

SRS transmission (with aperiodic SRS having a higher priority than semi-persistent and/or periodic SRS), or PRACH transmission on a serving cell other than the primary serving cell (PCell).

It is to be noted that, in case of same priority order and for operation with CA, the UE prioritizes power allocation for transmissions on the primary cell of the master cell group (MCG) or the secondary cell group (SCG) over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

This method specifies the priority order of power allocation of different channels during uplink power control, which prioritizes the transmit power of services of higher priority, thereby improving the reliability of the services of higher priority.

It is to be noted that the power control method for multiplexing multiple UCIs with different priorities in a PUCCH in the embodiments of the present disclosure is also applicable to a scenario where the priority indexes of the multiple UCIs are the same but the types of the multiple UCIs are different from each other, and applicable to a scenario where the priority indexes of the multiple UCIs are different from each other and the UCI types of the multiple UCIs are also different from each other.

It should be noted that the method for multiplexing the multiple UCIs with different priorities in a PUCCH in the embodiments of the present disclosure may also be applicable to multiplexing of unicast UCI(s) and groupcast (or multicast)/broadcast UCI(s). For example, UCI with larger priority index (for example, HARQ-ACK) in the embodiments of the present disclosure may be replaced with multicast/broadcast UCI, and UCI with smaller priority index (for example, HARQ-ACK) in the embodiments of the present disclosure may be replaced by unicast UCI. Alternatively, UCI with a smaller priority index (for example, HARQ-ACK) in the embodiments of the present disclosure may be replaced with multicast/broadcast UCI, and UCI with larger priority index (for example, HARQ-ACK) in the embodiments of the present disclosure may be replaced with unicast UCI.

In an embodiment, unicast may refer to a mode in which a network communicates with one UE, while groupcast/broadcast may refer to a mode in which the network communicates with multiple UEs. For example, a unicast PDSCH may be a PDSCH received by one UE, and the scrambling of the PDSCH may be based on a UE-specific radio network temporary indicator (RNTI), e.g., C-RNTI. A groupcast/broadcast PDSCH may be a PDSCH received by more than one UE at the same time, and the scrambling of the PDSCH may be based on a UE-group-common RNTI, e.g., groupcast/broadcast Services (MBS)-RNTI. Unicast UCI may include HARQ-ACK information, SR, or CSI of the unicast PDSCH. Groupcast (or multicast)/broadcast UCI may include HARQ-ACK information of the groupcast/broadcast PDSCH.

According to an embodiment, for single cell operation with two uplink carriers or for operation with CA, the sum of the power calculated separately by UE on each carrier and uplink cell would exceed the configured total UE transmit power. At this time, the UE should, according to transmission priority, prioritize the allocation of transmissions with higher priority, and reduce the power of transmissions with lower priority, so as to ensure that the sum of the power does not exceed the configured total transmit power. When multiplexing UCI(s) and/or data with different priority indexes, how to sort the priorities of different channels is a problem to be resolved.

In an embodiment, priority indexes with 2 levels are taken as an example to illustrate the rules for sorting the priorities of different channels. This embodiment can also be used in a scenario where the priority indexes are more than 2.

The UE can be configured with a PUCCH configuration list, and the PUCCH configuration list can include two PUCCH configurations. The priority of the first PUCCH configuration can be the smaller priority index (for example, priority index 0). The priority of the second PUCCH configuration can be the larger priority index (for example, priority index 1).

The UE does not support multiplexing UCI(s) with a larger priority index in a PUCCH with a smaller priority index for transmission.

The power allocated by the UE for PUSCH/PUCCH/PRACH/SRS transmission is sorted from high to low in the following order to ensure that the total power is less than or equal to the maximum transmit power.

PRACH transmission on the primary serving cell.

PUSCH transmission with HARQ-ACK information with a larger priority index (for example, priority index 1), or PUCCH transmission with HARQ-ACK information, and/or SR, and/or LRR with a larger priority index. It is to be noted that the PUSCH can be a PUSCH with a smaller priority index (for example, priority index 0) or a PUSCH with a larger priority index (for example, priority index 1).

PUSCH transmission with CSI with a larger priority index (for example, priority index 1). It is to be noted that the PUSCH can be a PUSCH with a smaller priority index (for example, priority index 0) or a PUSCH with a larger priority index (for example, priority index 1).

PUSCH transmission with a larger priority index (for example, priority index 1) without HARQ-ACK information or CSI with a larger priority index. The priorities of the PUSCHs can be further distinguished according to whether they include HARQ-ACK information or CSI with a smaller priority index (for example, priority index 0). For example, a PUSCH transmission with a larger priority index with HARQ-ACK information and/or CSI with a smaller priority index is of higher priority than a PUSCH transmission with a larger priority index without HARQ-ACK information and/or CSI with a smaller priority index. Or, a PUSCH transmission with a larger priority index with HARQ-ACK information and/or CSI with a smaller priority index is of a lower priority than a PUSCH transmission with a larger priority index without HARQ-ACK information and/or CSI with a smaller priority index. For Type-2 random access procedure, a PUSCH transmission with a larger priority index on primary serving cell is of the same priority as a PUSCH transmission with a larger priority index without HARQ-ACK information or CSI with a larger priority index. Or, for Type-2 random access procedure, a PUSCH transmission with a larger priority index on primary serving cell is of the same priority as a PUSCH transmission with a larger priority index without HARQ-ACK information or CSI with a larger priority index but with HARQ-ACK information and/or CSI with a smaller priority index. Or, for Type-2 random access procedure, a PUSCH transmission with a larger priority index on primary serving cell is of the same priority as a PUSCH transmission with a larger priority index without HARQ-ACK information or CSI with a larger priority index and without HARQ-ACK information and/or CSI with a smaller priority index.

PUSCH transmission with a smaller priority index (for example, priority index 0) without HARQ-ACK information or CSI with a larger priority index (for example, priority index 1), and/or PUCCH transmission with a smaller priority index (for example, priority index 0).

PUCCH transmission with a smaller priority index (for example, priority index 0) with HARQ-ACK information, and/or SR, and/or LRR with a smaller priority index, and/or PUSCH transmission with a smaller priority index with HARQ-ACK information with a smaller priority index.

PUCCH transmission with a smaller priority index (for example, priority index 0) with CSI with a smaller priority index, and/or PUSCH transmission with a smaller priority index with CSI with a smaller priority index.

PUSCH transmission with a smaller priority index (for example, priority index 0) without HARQ-ACK information or CSI with a smaller priority index, for Type-2 random access procedure, PUSCH transmission with a smaller priority index on primary serving cell.

SRS transmission (with aperiodic SRS having a higher priority than semi-persistent and/or periodic SRS), or PRACH transmission on a serving cell other than the PCell.

It is to be noted that, in case of same priority order and for operation with CA, the UE prioritizes power allocation for transmissions on the primary cell of the MCG or the SCG over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

This method specifies the priority order of power allocation of different channels during uplink power control, which prioritizes the transmit power of services of higher priority, thereby improving the reliability of the services of higher priority.

According to an embodiment, for single cell operation with two uplink carriers or for operation with CA, the sum of the power calculated separately by UE on each carrier and uplink cell would exceed the configured total UE transmit power. At this time, the UE should, according to transmission priority, prioritize the allocation of transmissions with higher priority, and reduce the power of transmissions with lower priority, so as to ensure that the sum of the power does not exceed the configured total transmit power. When multiplexing UCI(s) and/or data with different priority indexes, how to sort the priorities of different channels is a problem to be resolved.

In an embodiment, priority indexes with 2 levels are taken as an example to illustrate the rules for sorting the priorities of different channels. This embodiment can also be used in a scenario where the priority indexes are more than 2.

The UE can be configured with a PUCCH configuration list, and the PUCCH configuration list can include two PUCCH configurations. The priority of the first PUCCH configuration may be the smaller priority index (for example, priority index 0). The priority of the second PUCCH configuration may be the larger priority index (for example, priority index 1).

The UE does not support multiplexing UCI(s) and/or data with different priority indexes.

The power allocated by the UE for PUSCH/PUCCH/PRACH/SRS transmission is sorted from high to low in the following order to ensure that the total power is less than or equal to the maximum transmit power.

PRACH transmission on the primary serving cell.

PUSCH and/or PUCCH transmissions with a larger priority index (for example, priority index 1).

PUSCH and/or PUCCH transmissions with a smaller priority index (for example, priority index 0).

For PUCCH and/or PUSCH transmissions with a same priority index

PUCCH transmission with HARQ-ACK information, and/or SR, and/or LRR, or PUSCH transmission with HARQ-ACK information PUCCH transmission with CSI or PUSCH transmission with CSI PUSCH transmission without HARQ-ACK information or CSI and, for Type-2 random access procedure, PUSCH transmission on the primary serving cell.

SRS transmission (with aperiodic SRS having a higher priority than semi-persistent and/or periodic SRS), or PRACH transmission on a serving cell other than the PCell.

It is to be noted that, in case of the same priority order and for operation with CA, the UE prioritizes power allocation for transmissions on the primary cell of the MCG or the SCG over transmissions on a secondary cell. In case of same priority order and for operation with two UL carriers, the UE prioritizes power allocation for transmissions on the carrier where the UE is configured to transmit PUCCH. If PUCCH is not configured for any of the two UL carriers, the UE prioritizes power allocation for transmissions on the non-supplementary UL carrier.

This method specifies the priority order of power allocation of different channels during uplink power control, which prioritizes the transmit power of services of higher priority, thereby improving the reliability of the services of higher priority. It is clarified that the priority of a channel with a higher priority index is higher than the priority of a channel with a low priority index, the behavior of a UE is also clarified, and the reliability of uplink transmission is improved. For uplink channels with a same priority, if the UE supports PUCCH/PUSCH simultaneous transmissions, this method determines the priority order used when PUCCH and PUSCH coexist, clarifies the behavior of the UE, and improves the reliability of uplink transmission.

According to an embodiment, when power allocation is performed for PUCCH and/or PUSCH, at least one of the following rules may be used to ensure that the total power is less than or equal to the maximum transmit power:

Rule 1: PUSCH transmission of a larger priority index (for example, priority index 1) with HARQ-ACK information of a larger priority index, or PUCCH transmission of a larger priority index with HARQ-ACK information, and/or SR, and/or LRR of a larger priority index is of higher priority than other PUCCH/PUSCH transmissions excluding PRACH transmission on primary serving cell.

Rule 2: PUSCH transmission with HARQ-ACK information of a larger priority index (for example, priority index 1), or PUCCH transmission of a larger priority index with HARQ-ACK information, and/or SR, and/or LRR of a larger priority index is of higher priority than other PUCCH/PUSCH transmissions excluding PRACH transmission on primary serving cell.

Rule 3: PUSCH transmission of a larger priority index (for example, priority index 1) with HARQ-ACK information of a larger priority index, or PUCCH transmission of a larger priority index with HARQ-ACK information, and/or SR, and/or LRR of a larger priority index is of higher priority than PUSCH transmission with a smaller priority index (for example, priority index 0) with HARQ-ACK information of a larger priority index.

Rule 4: a priority index of a PUSCH may be determined according to a highest priority index of the priority indexes of data and control information in the PUSCH.

Rule 5: a priority index of a PUCCH may be determined according to a highest priority index of the priority index(es) of control information with the highest priority in the PUCCH.

Rule 6: PUSCH transmission of a larger priority index (for example, priority index 1) with CSI is of higher (or lower) priority than PUSCH transmission of a smaller priority index (for example, priority index 0) with HARQ-ACK information of a larger priority index.

Rule 7: PUSCH transmission of a smaller priority index (for example, priority index 0) with HARQ-ACK information of a larger priority index (for example, priority index 1) is of higher (or lower) priority than PUSCH transmission of a larger priority index without HARQ-ACK or CSI.

For example, the power allocated by the UE for PUSCH/PUCCH/PRACH/SRS transmission is sorted from high to low in the following order to ensure that the total power is less than or equal to the maximum transmit power.

PRACH transmission on the primary serving cell.

PUSCH and/or PUCCH transmission and/or UCI transmission of a larger priority index (for example, priority index 1). It is be noted that the priority index of a PUSCH can be determined according to a highest priority index of the priority indexes of data and control information in the PUSCH. For example, for a PUSCH of a smaller priority index (for example, priority index 0) with HARQ-ACK information of a larger priority index, its priority index is determined to be the larger priority index. The priority index of a PUCCH may be determined according to a highest priority index of the priority index(es) of control information in the PUCCH.

PUSCH and/or PUCCH transmission of a smaller priority index (for example, priority index 0).

wherein, for PUCCH and/or PUSCH transmissions of a same priority index, it is sorted from high to low in the following order:

PUCCH transmission with HARQ-ACK information, and/or SR, and/or LRR, and/or PUSCH transmission with HARQ-ACK information.

PUCCH transmission with HARQ-ACK information of a higher priority index and/or PUSCH transmission with HARQ-ACK information of a higher priority index is of higher priority than a PUSCH transmission only with HARQ-ACK information of a lower priority index.

PUCCH transmission with CSI and/or PUSCH transmission with CSI.

PUSCH transmission without HARQ-ACK information or CSI, and, for Type-2 random access procedure, PUSCH transmission on primary serving cell.

SRS transmission (with aperiodic SRS having a higher priority than semi-persistent and/or periodic SRS), or PRACH transmission on a serving cell other than the PCell.

This method specifies the priority order of power allocation of different channels during uplink power control, which prioritizes the transmit power of services of higher priority, thereby improving the reliability of the services of higher priority. It is clarified that the priority of a channel with a higher priority index is higher than the priority of a channel with a low priority index, the behavior of a UE is also clarified, and the reliability of uplink transmission is improved.

Embodiment 3

In step 201, the UE receives downlink data and/or downlink control signaling from a base station.

In step 202, the UE determines uplink data and/or uplink control signaling and an uplink time unit, an uplink physical channel and the power in which the second type of data and/or the second type of control signaling is transmitted based on the downlink data and/or downlink control signaling.

In step 203, the UE transmits the uplink data and/or the uplink control signaling to the base station with the determined power for transmitting the second type of data and/or the second type of control signaling, in the determined uplink time unit.

In some implementations, the UE may be configured with two levels of priorities for uplink transmission. For example, the two levels of priorities may include a first priority and a second priority which are different from each other. In one example, the first priority may be higher than the second priority. However, the embodiments of the present disclosure are not limited to this, for example, the UE may be configured with more than two levels of priorities. For the sake of convenience, in the embodiments of the present disclosure, description will be made considering that the first priority is higher than the second priority.

In one example, the two levels of priorities may be indicated by priority numbers or priority indexes (e.g., a larger priority index (e.g., priority index 1) and a smaller priority index (for example, priority index 0)). For example, a larger priority index may correspond to a higher priority, that is, a priority corresponding to a larger priority index (for example, priority index 1) may be higher than a priority corresponding to a smaller priority index (for example, priority index 0). In this case, a larger priority index (e.g., priority index 1) may be the first priority), and a smaller priority index (e.g., priority index 0) may be the second priority. However, the embodiments of the present disclosure are not limited to this, for example, other priority indexes or indicators may be used to indicate the two levels of priorities. For the sake of convenience, in the embodiments of the present disclosure, description is made considering that a priority corresponding to a larger priority index (e.g., priority index 1) is higher than a priority corresponding to a smaller priority index (e.g., priority index 0). In addition, in the embodiments of the present disclosure, the larger priority index (e.g. priority index 1) may be used interchangeably with the first priority or the higher priority, and the smaller priority index (e.g., priority index 0) may be used interchangeably with the second priority or the lower priority.

In some implementations, the two levels of priorities configured for the UE may be two physical layer priorities. For example, one of the two levels of priorities (the first priority (e.g., the larger priority index (e.g., priority index 1)) or the second priority (e.g., the smaller priority index (e.g., priority index 0))) may be provided for PUSCH or PUCCH. Specifically, a PUSCH or PUCCH transmission (including a transmission with repetitions if there is a transmission with repetitions) may be of (e.g., correspond to) the smaller priority index (e.g., priority index 0 or a larger priority index (e.g., priority index 1).

In an example, for a configured grant PUSCH transmission, the UE may determine the priority index according to a parameter of priority (if configured). For a PUCCH transmission with HARQ-ACK information corresponding to a SPS PDSCH reception or a SPS PDSCH release, the UE may determine the priority index of the PUCCH transmission from a parameter of HARQ-CodebookID (if configured). If no priority index is configured for a certain PUSCH or PUCCH transmission of the UE, the priority index of the PUSCH or PUCCH transmission may be 0.

If the UE monitors PDCCH in an activated DL BWP for detection of DCI format 0_1 and DCI format 1_1, or for detection of DCI format 0_2 and DCI format 1_2, the priority index may be provided by a priority indicator field. If the UE indicates a capability to monitor PDCCH in an activated DL BWP for detection of DCI format 0_1 and DCI format 1_1, and for detection of DCI format 0_2 and DCI format 1_2, DCI format 0_1 or DCI format 0_2 may schedule a PUSCH transmission with any priority, and DCI format 1_1 or DCI format 1_2 may schedule a PDSCH reception and trigger a PUCCH transmission of corresponding HARQ-ACK information with any priority.

In an example, the UE may be configured with a PUCCH configuration list, which may contain two PUCCH configurations, including a first PUCCH configuration and a second PUCCH configuration. For example, the priority of the first PUCCH configuration may be the second priority (e.g., the smaller priority index (e.g., priority index 0)), and the priority of the second PUCCH configuration may be the first priority (e.g., the larger priority index (e.g., priority index 1)).

For example, a sub-slot length of each PUCCH configuration of the first PUCCH configuration and the second PUCCH configuration may be 7 OFDM symbols or 2 OFDM symbols. Sub-slot lengths of different PUCCH configurations may be configured separately.

In some embodiments, the UE may be configured with a pdsch-HARQ-ACK-CodebookList. For example, the pdsch-HARQ-ACK-CodebookList may contain two pdsch-HARQ-ACK-Codebook configurations, corresponding to a first HARQ-ACK codebook and a second HARQ-ACK codebook. For example, the first HARQ-ACK codebook is associated with a PUCCH with the smaller priority index (e.g., priority index 0), and the second HARQ-ACK codebook is associated with a PUCCH with the larger priority index (e.g., priority index 1). In this case, the priority of the first HARQ-ACK codebook may be the second priority (e.g., the smaller priority index (e.g., priority index 0)), and the priority of the second HARQ-ACK codebook may be the first priority (e.g., the larger priority index (e.g., priority index 1)).

When a PUCCH of smaller priority index (e.g., priority index 0) and a PUCCH of larger priority index (e.g., priority index 1) overlap in time, how to determine the UCI information carried by the multiplexed PUCCH is a problem that needs to be resolved.

The PUCCH of smaller priority index (e.g., priority index 0) can include HARQ-ACK of smaller priority index, and/or an SR of smaller priority index, and/or an LRR of smaller priority index, and/or CSI of smaller priority index.

The PUCCH of larger priority index (e.g., priority index 1) can include HARQ-ACK of larger priority index, and/or an SR of larger priority index, and/or an LRR of larger priority index.

If the PUCCH of larger priority index (e.g., priority index 1) includes an SR of larger priority index and/or an LRR of larger priority index, the UE multiplexes HARQ-ACK of larger priority index included, and/or the SR of larger priority index and/or the LRR of larger priority index included in the PUCCH of larger priority index with HARQ-ACK of smaller priority index (e.g., priority index 0) included in the PUCCH of smaller priority index in one PUCCH, the UE does not transmit CSI of smaller priority index, and/or the UE does not transmit the SR of smaller priority index and/or the LRR of smaller priority index.

The UE can report a capability of whether supporting multiplexing of UCIs with different priority indexes. For example, the UE can report that the multiplexing of HARQ-ACK of smaller priority index (e.g., priority index 0) and HARQ-ACK and SR and/or LLR of larger priority index (e.g., priority index 1) is supported. Alternatively, the UE can report that the multiplexing of the HARQ-ACK of smaller priority index and UCI of larger priority index is supported. The UE can multiplex the HARQ-ACK of larger priority index included and/or the SR of larger priority index, and/or the LRR of larger priority index included in the PUCCH of larger priority index and the HARQ-ACK of smaller priority index included in the PUCCH of smaller priority index in one PUCCH, the UE does not transmit the CSI of smaller priority index and the UE does not transmit the SR of smaller priority index and the LRR of smaller priority index.

Alternatively, the UE can report that the multiplexing of the HARQ-ACK and the SR of smaller priority index (e.g., priority index 0) and the HARQ-ACK and the SR of larger priority index (e.g., priority index 1) is supported. The UE can multiplex the HARQ-ACK of larger priority index included and/or the SR of larger priority index included in the PUCCH of larger priority index and the HARQ-ACK and SR of the smaller priority index included in the PUCCH of smaller priority index in one PUCCH, and the UE does not transmit the CSI of smaller priority index.

If the SR of larger priority index (e.g., priority index 1) and/or the LRR of larger priority index are not included in the PUCCH of larger priority index, then the UE multiplexes the HARQ-ACK of larger priority index included in the PUCCH of larger priority index and the HARQ-ACK and/or the SR and/or the LRR of smaller priority index (e.g., priority index 0) in one PUCCH, the UE does not transmit the CSI of smaller priority index. Alternatively, the UE multiplexes the HARQ-ACK of larger priority index and the HARQ-ACK of smaller priority index in one PUCCH, the UE does not transmit the CSI of smaller priority index, and/or the UE does not transmit the SR and/or the LRR of smaller priority index.

The UE can report a capability of whether supporting the multiplexing of UCIs with different priority indexes. For example, the UE can report that the multiplexing of the HARQ-ACK of smaller priority index (e.g., priority index 0) and the HARQ-ACK of larger priority index (e.g., priority index 1) is supported. The UE multiplexes the HARQ-ACK of larger priority index included in the PUCCH of larger priority index and the HARQ-ACK of smaller priority index included in the PUCCH of smaller priority index in one PUCCH, the UE does not transmit the CSI of smaller priority index, and the UE does not transmit the SR of smaller priority index and/or the LRR of smaller priority index.

Alternatively, the UE can report that the multiplexing of the HARQ-ACK and the SR of smaller priority index (e.g., priority index 0) and the HARQ-ACK of larger priority index (e.g., priority index 1) is supported. The UE multiplexes the HARQ-ACK of larger priority index included in the PUCCH of larger priority index and the HARQ-ACK and the SR of smaller priority index included in the PUCCH of smaller priority index in one PUCCH, the UE does not transmit the CSI of smaller priority index.

Since the transmission time unit of the PUCCH of smaller priority index (e.g., priority index 0) and that of the PUCCH of larger priority index (e.g., priority index 1) cannot be the same, the processing can be performed for transmission time unit of each PUCCH of larger priority index when dealing with time domain overlapping.

In the first PDCCH reception, if the first PUCCH of larger priority index, the PUSCH of smaller priority index or the second PUCCH are scheduled by the first DCI format, and the transmission of the first PUCCH would overlap a transmission of the PUSCH or the second PUCCH in time, the UE cancels the transmission of the PUSCH or the second PUCCH before the first symbol overlaps with the transmission of the first PUCCH. The UE expects that the transmission of the first PUCCH would not start before T_1 (proc, 2)+d_1 after the last symbol received by the first PDCCH.

This method can transmit HARQ-ACK information and/or SR information of lower priority while ensuring the reliability of transmission of UCI with high priority. Without affecting the reliability of UCI with high-priority, transmission opportunities of UCI of lower priority can be increased, thereby reducing the number of retransmissions of downlink data with lower priority and user plane delay, and improving the spectrum efficiency of the network.

When a PUCCH of smaller priority index (e.g., priority index 0) and a PUCCH of larger priority index (e.g., priority index 1) overlap in time, how to determine the timing relationship that multiplexing should satisfy is a problem that needs to be resolved.

In the first PDCCH reception, the first PUCCH of larger priority index and the second PUCCH of smaller priority index are scheduled by the first DCI format, and the transmission of the first PUCCH would overlap with the transmission of the second PUCCH in time. When the start time of the second PUCCH minus the end time of the first PDCCH is greater than or equal to T1+d1, the UCI information carried by the second PUCCH and the UCI information carried by the first PUCCH can be multiplexed in one PUCCH for transmission. The UE does not transmit the second PUCCH. When the start time of the second PUCCH minus the end time of the first PDCCH is less than or equal to T1+d1, the UE transmits the second PUCCH, and the UE cancels the second PUCCH transmission that overlaps with the first PUCCH in the time domain.

The UE can report a capability of whether supporting multiplexing the UCI carried by the cancelled PUCCH of lower priority and the UCI of higher priority. If the UE reports a capability of supporting the function, the base station can enable the function through higher-layer signaling configuration. The UE multiplexes the UCI carried by the cancelled second PUCCH of lower priority and the UCI of higher priority.

T1 can be the preparation time of the PUSCH, and T1 can be determined according to the UE processing capability type, μ and N2. For example, when the UE is configured with the parameter processingType2Enabled, T1 is determined by Table 4, otherwise, T1 is determined by Table 3. d1 is determined by the UE capability report. μ is determined by the minimum sub-carrier spacing (SCS) configuration among the first PDCCH, the first PUCCH or the second PUCCH.

TABLE 3

PUSCH preparation time for UE processing capability 1

| μ | PUSCH preparation time $N_2$ [number of OFDM symbols] |
|---|---|
| 0 | 10 |
| 1 | 12 |
| 2 | 23 |
| 3 | 36 |

TABLE 4

PUSCH preparation time for UE processing capability 1

| μ | PUSCH preparation time $N_2$ [number of OFDM symbols] |
|---|---|
| 0 | 5 |
| 1 | 5.5 |
| 2 | 11 or frequency range 1 |

This method defines the timing relationship that the UE should satisfy when multiplexing UCIs with different priorities, clarifies the behavior of the UE, and improves the reliability of transmission. The complexity of network decoding is reduced.

When a PUCCH of smaller priority index (e.g., priority index 0) and a PUSCH of larger priority index (e.g., priority index 1) overlap in time, how to determine the timing relationship that multiplexing should satisfy is a problem that needs to be resolved.

In a PDCCH reception, the PUSCH of larger priority index and the PUCCH of smaller priority index are scheduled by the first DCI format, and the transmission of the PUSCH would overlap with the transmission of the PUCCH in time. When the start time of the PUCCH minus the end time of the PDCCH is greater than or equal to T2+d2, the UCI information carried by the PUCCH can be multiplexed in PUSCH for transmission. The UE does not transmit PUCCH. When the start time of the PUCCH minus the end time of the PDCCH is less than or equal to T2+d2, the UE transmits the PUCCH, and the UE can cancel the PUCCH transmission that overlaps with the PUSCH in the time domain.

The UE can report a capability of whether supporting multiplexing the UCI carried by the cancelled PUCCH of lower priority and the PUSCH of higher priority. If the UE reports that it supports the function, the base station can enable the function through higher-layer signaling configuration. The UE multiplexes the UCI carried by the cancelled PUCCH of lower priority and the PUSCH of higher priority.

T2 can be the preparation time of the PUSCH, and T2 can be determined according to the UE processing capability type, μ and N2. For example, when the UE is configured with the parameter processingType2Enabled, T2 is determined by Table 4, otherwise, T2 is determined by Table 3. d2 is determined by the UE capability report. μ is determined by the minimum SCS configuration among the PDCCH, PUSCH or PUCCH.

This method defines the timing relationship that the UE should satisfy when multiplexing UCIs with different priorities and uplink data, clarifies the behavior of the UE, and improves the reliability of transmission. The complexity of network decoding is reduced.

When a PUCCH of smaller priority index (e.g., priority index 0) and at least one PUSCH of larger priority index (e.g., priority index 1) overlap in time, how to determine PUCCH of smaller priority index is multiplexed with which one of the PUSCHs of larger priority index and the UCI(s) information carried by the multiplexed PUSCH is a problem that needs to be resolved.

In one example, the two levels of priorities can be indicated by priority number or priority index (e.g., a larger priority index (e.g., priority index 1) and a smaller priority index (e.g., priority index 0)). For example, the larger priority index can correspond to a higher priority, that is, the priority corresponding to the larger priority index (e.g., priority index 1) can be higher than the priority corresponding to the smaller priority index (e.g., priority index 0). In this case, the larger priority index (e.g., priority index 1) can be the first priority, and the smaller priority index (e.g., priority index 0) can be the second priority. However, the embodiment of the present disclosure is not limited thereto, for example, other priority indexes or indicators can be used to indicate the two levels of priorities. For the purpose of convenience, in the embodiments of the present disclosure, it is considered that the priority corresponding to the larger priority index (e.g., priority index 1) is higher than the priority corresponding to a smaller priority index (e.g., priority index 0). In addition, in the embodiments of the present disclosure, the larger priority index can be used interchangeably with first priority or higher priority, and the smaller priority index can be used interchangeably with second priority or lower priority.

In some embodiments, the two levels of priorities configured for the UE can be two physical layer priorities. For example, one of the two levels of priorities (first priority (e.g., the larger priority index (e.g., priority index 1)) or the second priority (e.g., the smaller priority index (e.g., priority index 0))) can be provided for PUSCH or PUCCH. Specifically, a PUSCH or PUCCH transmission (including a transmission with repetitions if there is a transmission with repetitions) can be of (e.g., corresponding to) the smaller priority index (e.g., priority index 0) or the larger priority index (e.g., priority index 1).

When a PUCCH of smaller priority index (e.g., priority index 0) and at least one PUSCH of larger priority index (e.g., priority index 1) overlap in time, how to determine PUCCH with a smaller priority index is multiplexed with which one of the PUSCHs of larger priority index and the UCI(s) information carried by the multiplexed PUSCH is a problem that needs to be resolved.

The PUCCH of smaller priority index (e.g., priority index 0) can include the HARQ-ACK of smaller priority index, and/or the SR of smaller priority index, and/or the LRR of smaller priority index, and/or the CSI of smaller priority index.

A PUSCH of larger priority index (e.g., priority index 1) can include the HARQ-ACK with the larger priority index, and/or the CSI of larger priority index, and/or uplink data of larger priority index.

In the case where the number of PUSCHs of larger priority index (e.g., priority index 1) is more than 1, the following methods may be utilized:

Method 1: the UE multiplexes the HARQ-ACK of smaller priority index (e.g., priority index 0) and/or the CSI of smaller priority index in the PUSCH of larger priority index (e.g., priority index 1) that does not include UCI information.

If the number of PUSCHs of larger priority index (e.g., priority index 1) that does not include UCI information is greater than 1, the UE can determine one PUSCH according to the specified method. For example, the UE can determine one PUSCH according to the method specified in 3GPP TS 38.213, and then multiplex the HARQ-ACK and/or the CSI of smaller priority index (e.g., priority index 0) in the determined PUSCH. The UE does not transmit the SR and/or the LRR of smaller priority index. The UE does not transmit the CSI of smaller priority index.

Alternatively, the UE determines one PUSCH from PUSCHs of larger priority index (e.g., priority index 1) that do not include the UCI information and satisfy predefined condition(s). The predefined condition can be that the number of PUSCH resources is greater than a threshold value. The number of PUSCH resources can be the number of REs, or the number of RBs, or the number of REs excluding DMRS, or the number of REs that can carry UCI. If the number of PUSCHs of larger priority index (e.g., priority index 1) that do not include UCI information and satisfy the predefined condition(s) is 0, the UE can multiplex the HARQ-ACK of smaller priority index (e.g., priority index 0) in the PUSCH of larger priority index including UCI information.

Method 1 can be applied based on the capability reported by the UE. For example, the UE can report that it supports the multiplexing of the HARQ-ACK of smaller priority index (e.g., priority index 0) and/or the CSI of smaller priority index in the PUSCH of larger priority index (e.g., priority index 1) that does not include UCI information. Alternatively, the UE can report that it supports the multiplexing of the HARQ-ACK of smaller priority index and/or the CSI of smaller priority index to the PUSCH of larger priority index. Alternatively, the UE can report that it supports the multiplexing of the HARQ-ACK of smaller priority index and/or the CSI of smaller priority index in the PUSCH of larger priority index that includes UCI information. It should be noted that the UE can also report the type of UCI information included.

Method 2: the UE multiplexes the HARQ-ACK of smaller priority index (e.g., priority index 0) in the PUSCH of larger priority index (e.g., priority index 1) including UCI information. The UE does not transmit the SR and/or the LRR of smaller priority index, and the UE does not transmit the CSI of smaller priority index.

Method 2 can be applied based on the capability reported by the UE. The UE can report that it supports the multiplexing of the HARQ-ACK of smaller priority index (e.g., priority index 0) in the PUSCH of larger priority index (e.g., priority index 1) including UCI information. When the UE reports that it supports the function, the base station can configure the UE to use Method 2 through higher-layer signaling.

Method 3: if the resource of the PUSCH of larger priority index (e.g., priority index 1) including UCI information can carry the HARQ-ACK information of smaller priority index (e.g., priority index 0), the UE can multiplex the HARQ-ACK of smaller priority index in the PUSCH of larger priority index including UCI information. Otherwise, the UE multiplexes the HARQ-ACK of smaller priority index in the PUSCH of larger priority index that does not include UCI information. The PUSCH of larger priority index that does not include UCI information can be determined according to Method 1.

Method 4: the UE determines a PUSCH from PUSCHs of larger priority index (e.g., priority index 1) that satisfy predefined condition(s). The predefined condition(s) can be that the number of PUSCH resources is greater than the threshold value. The number of PUSCH resources can be the number of REs, or the number of RBs, or the number of REs excluding the DMRS, or the number of REs that can carry UCI. For example, the UE can determine one PUSCH from PUSCHs of larger priority index that satisfy the predefined condition(s) according to the method specified in 3GPP TS 38.213, and then multiplex the HARQ-ACK and/or the CSI of smaller priority index (e.g., priority index 0) in the determined PUSCH.

If the number of PUSCHs of larger priority index (e.g., priority index 1) that satisfy the predefined condition(s) is 1 and the UCI information of larger priority index is included, the UE does not transmit the UCI information of smaller priority index (e.g., priority index 0).

If there is no PUSCH that satisfies the predefined condition(s), the UE does not transmit PUCCH of smaller priority index (e.g., priority index 0) and UCI information of smaller priority index.

This method resolves the problem of which PUSCH is multiplexed with the PUCCH of smaller priority index (e.g., priority index 0). Method 1 can reduce the delay of multiplexing of UCI with high-priority and improve the reliability of transmission of UCI with lower priority, and can also improve the reliability of transmission of PUSCH with high-priority. Method 2 is simpler to implement and has less impact on the protocol. Method 3 can improve the reliability of transmission of PUSCH with high-priority. Method 4 can improve the reliability of transmission of UCI with lower priority, and can improve the reliability of transmission of PUSCH with high-priority.

When a PUCCH of smaller priority index (e.g., priority index 0) and at least one PUSCH of smaller priority index overlap in time, how to determine the UCI information carried by the multiplexed PUSCH is a problem that needs to be resolved.

The PUCCH of smaller priority index (e.g., priority index 0) can include the HARQ-ACK of smaller priority index and/or the CSI of smaller priority index.

The UE determines the PUSCHs of smaller priority index (e.g., priority index 0) that do not collide with the PUSCHs of larger priority index (e.g., priority index 1) from the PUSCHs of smaller priority index to form a set A0. "Collide" means that two PUSCHs cannot be transmitted at the same time, so that the UE only transmits the PUSCH of higher priority, and does not transmit the PUSCH of lower priority. The colliding can be that two PUSCHs on the activated BWP of the same carrier overlap in time. The colliding can also be that two PUSCHs on the same carrier overlap in time.

The UE multiplexes the HARQ-ACK and/or CSI of smaller priority index (e.g., priority index 0) in one PUSCH in the set A0 according to the specified method. For example, the UE can determine one PUSCH in the set A0 to multiplex HARQ-ACK and/or CSI of smaller priority index according to the method specified in 3GPP TS 38.213. Alternatively, the UE can determine one PUSCH in the set A0 to multiplex the HARQ-ACK and/or CSI of smaller priority index according to the method of other embodiments.

This method resolves the problem of multiplexing the PUCCH of smaller priority index (e.g., priority index 0) and which one of the PUSCHs of smaller priority index. This method avoids the multiplexing of the UCI with lower priority to the PUSCH with lower priority that collides with the PUSCH with high-priority, increases the transmission probability of the UCI with lower priority, and reduces the number of retransmissions of downlink data with lower priority and the user plane delay, which can improve the spectrum efficiency of the network.

When a PUCCH of larger priority index (e.g., priority index 1) and at least one PUSCH of smaller priority index (e.g., priority index 0) overlap in time, how to determine the PUCCH of larger priority index is multiplexed with which one of the PUSCHs and the UCI information carried by the multiplexed PUSCH is a problem that needs to be resolved.

The PUCCH of larger priority index (e.g., priority index 1) can include the HARQ-ACK of larger priority index, and/or the SR of larger priority index, and/or the LRR of larger priority index.

A PUSCH of smaller priority index (e.g., priority index 0) can include the HARQ-ACK of smaller priority index, and/or the CSI of smaller priority index, and/or uplink data of smaller priority index.

In the case where the number of PUSCHs of smaller priority index (e.g., priority index 0) is more than 1, the following methods can be utilized:

Method 1: the UE multiplexes the HARQ-ACK, and/or SR, and/or LRR of larger priority index (e.g., priority index 1) in the PUSCH of smaller priority index (e.g., priority index 0) that does not include UCI information.

The UE can report that it supports the multiplexing of the HARQ-ACK and/or CSI of larger priority index (e.g., priority index 1) in the PUSCH of smaller priority index (e.g., priority index 0) that does not include UCI Information. Alternatively, the UE can report that it supports the multiplexing of the HARQ-ACK and/or CSI of larger priority index in the PUSCH of smaller priority index that does not include HARQ-ACK and/or CSI.

If the number of PUSCHs of smaller priority index (e.g., priority index 0) that do not include UCI information is greater than 1, the UE can determine one PUSCH according to the specified method. For example, the UE can determine one PUSCH according to the method specified in 3GPP TS 38.213, and then multiplex HARQ-ACK, and/or SR, and/or LRR of larger priority index (e.g., priority index 1) in the determined PUSCH.

Alternatively, the UE determines one PUSCH from PUSCHs of smaller priority index (e.g., priority index 0) that do not include UCI information and satisfy predefined condition(s). The predefined condition(s) can be that the number of PUSCH resources is greater than a threshold value. The number of PUSCH resources can be the number of REs, or the number of RBs, or the number of REs excluding the DMRS, or the number of REs that can carry UCI.

Method 2: The UE multiplexes the HARQ-ACK, and/or SR, and/or LRR of larger priority index (e.g., priority index 1) in the PUSCH of smaller priority index (e.g., priority index 0) including UCI information.

The UE can report that it supports the multiplexing of the HARQ-ACK and/or CSI of larger priority index (e.g., priority index 1) in the PUSCH of smaller priority index (e.g., priority index 0) including the UCI information. Alternatively, the UE can report that it supports the multiplexing of the HARQ-ACK and/or CSI of larger priority index in the PUSCH of smaller priority index including the HARQ-ACK and/or CSI.

Method 3: if the resource of the PUSCH of smaller priority index (e.g., priority index 0) including UCI information can carry the HARQ-ACK, and/or SR, and/or LRR information of larger priority index (e.g., priority index 1), the UE multiplexes the HARQ-ACK, and/or SR, and/or LRR of larger priority index in the PUSCH of smaller priority index including UCI information. Otherwise, the UE multiplexes the HARQ-ACK, and/or SR, and/or LRR of larger priority index in the PUSCH with the smaller priority index that does not include UCI information. The PUSCH of smaller priority index that does not include UCI information can be determined according to Method 1.

Method 4: the UE determines one PUSCH from PUSCHs of smaller priority index (e.g., priority index 0) that satisfy predefined condition(s). The predefined condition(s) can be that the number of PUSCH resources is greater than a threshold value. The number of PUSCH resources can be the number of REs, or the number of RBs, or the number of REs excluding the DMRS, or the number of REs that can carry UCI. The predefined condition(s) can also be that the number of OFDM symbols of the PUSCH is less than a threshold value. Since the SCS of the PUSCH of each carrier can be different, the number of OFDM symbols can be referred to the SCS of the PUCCH. The predefined condition(s) can also be that the transmission time of the PUSCH is less than a threshold value. The UE determines one PUSCH from the PUSCHs of smaller priority index that satisfy predefined condition(s) according to the specified method. For example, the UE can determine one PUSCH from PUSCHs of smaller priority index that satisfy the predefined conditions according to the method specified in 3GPP TS 38.213, and then multiplex the HARQ-ACK, and/or SR, and/or LRR of larger priority index (e.g., priority index 1) in the determined PUSCH.

If the number of PUSCHs of smaller priority index (e.g., priority index 0) that satisfy the predefined condition(s) is 1 and the UCI information of smaller priority index is included, the UE does not transmit the PUSCH of smaller priority index, and the UE multiplexes the UCI of smaller priority index and the UCI of larger priority index (e.g., priority index 1) in one PUCCH.

If there is no PUSCH that satisfies the predefined condition(s), the UE does not transmit PUSCH of smaller priority index (e.g., priority index 0).

The UE multiplexes the HARQ-ACK, and/or SR, and/or LRR of larger priority index (e.g., priority index 1) in a PUSCH with the earliest start transmission time among at least one PUSCH of smaller priority index (e.g., priority index 0).

The UE multiplexes the HARQ-ACK, and/or SR, and/or LRR of larger priority index (e.g., priority index 1) in a PUSCH with the earliest starting DMRS transmission time among at least one PUSCH of smaller priority index (e.g., priority index 0).

This method resolves the problem of which PUSCH is multiplexed with the PUCCH of larger priority index (e.g., priority index 1). Method 1 can reduce the delay of multiplexing of UCI with lower priority and improve the reliability of transmission of UCI with lower priority, and can also improve the reliability of transmission of PUSCH with lower priority. Method 2 is simpler to implement and has less impact on the protocol. Method 3 can improve the reliability of transmission of PUSCH with lower priority. Method 4 can improve the reliability of transmission of UCI with higher priority, and can improve the reliability of transmission of PUSCH with lower priority.

On one carrier, when a PUSCH of smaller priority index (e.g., priority index 0) carrying UCI of smaller priority index and a PUSCH of larger priority index (e.g., priority index 1) overlap in time, how to determine the multiplexing method of UCI of smaller priority index is a problem that needs to be resolved.

The UCI of smaller priority index (e.g., priority index 0) can include the HARQ-ACK of smaller priority index, and/or the CSI of smaller priority index.

If the PUSCH of larger priority index (e.g., priority index 1) satisfies predefined condition(s), the UE multiplexes all or part of the UCI information of smaller priority index (e.g., priority index 0) in the PUSCH of larger priority index, the UE does not transmit the PUSCH with the smaller priority index.

The predefined condition(s) can be that the number of PUSCH resources is greater than a threshold value. The number of PUSCH resources can be the number of REs, the number of RBs, or the number of REs excluding the DMRS, or the number of REs that can carry UCI of smaller priority index (e.g., priority index 0). Alternatively, the predefined condition(s) can also be that the PUSCH of larger priority index (e.g., priority index 1) does not include UCI information of larger priority index. Alternatively, the predefined condition(s) can also be that the PUSCH of larger priority index does not include HARQ-ACK information with a larger priority index. The predefined conditions can also be that the function is reported to be supported by UE capability. For example, the UE can report that it supports the multiplexing of the HARQ-ACK and/or CSI of smaller priority index in the PUSCH of larger priority index. Alternatively, the UE can report that it supports the multiplexing HARQ-ACK and/or CSI of smaller priority index in PUSCH of larger priority index that does not include UCI information. Alternatively, the UE can report that it supports the multiplexing of HARQ-ACK and/or CSI of smaller priority index in the PUSCH of larger priority index including HARQ-ACK and/or CSI.

When multiple PUSCHs of larger priority index (e.g., priority index 1) and the PUSCH of smaller priority index (e.g., priority index 0) overlap in time, the UE can determine one PUSCH of larger priority index, according to the method of other embodiments of the disclosure, the UE multiplexes all or part of the UCI information of smaller priority index in the PUSCH of larger priority index, the UE does not transmit the PUSCH of smaller priority index.

It should be noted that part of the UCI information can be HARQ-ACK information.

The present disclosure can increase the possibility of transmission of UCI with lower priority, can reduce the probability of retransmission of downlink data with lower priority, can improve network spectrum utilization, and can also reduce the transmission delay of downlink data.

The HARQ-ACK codebook of a priority for the UE is a semi-static HARQ-ACK codebook, e.g., the HARQ-ACK codebook of smaller priority index (e.g., priority index 0) is a semi-static HARQ-ACK codebook. When a UL DAI field in the uplink DCI format indicates $V_{T\text{-}DAI}^{UL}=1$, the UE multiplexes the semi-static HARQ-ACK codebook in the PUSCH scheduled by the DCI. Otherwise, the UE would not multiplex the HARQ-ACK codebook in the PUSCH.

The base station schedules 2 PUSCHs for the UE, in which DCI #1 schedules PUSCH #1, and DCI #2 schedules PUSCH #2. These two PUSCHs both overlap with the PUCCH carrying HARQ-ACK in the time domain. The base station expects the UE to multiplex HARQ-ACK in PUSCH #2, and DCI #2 indicates $V_{T\text{-}DAI}^{UL}=1$. The base station does not expect the UE to multiplex HARQ-ACK in PUSCH #1, and DCI #1 indicates $V_{T\text{-}DAI}^{UL}=0$. If the UE does not decode DCI #2 correctly, in the case where the PUCCH and PUSCH #1 overlap in time, the UE expects to multiplex the HARQ-ACK carried in PUCCH in PUSCH #1, and DCI #1 indicates that the UE would not transmit HARQ-ACK on PUSCH #1. At this time, the behavior of the UE is undefined. In order to resolve this problem, the following approaches can be used.

Approach 1: the UE determines one PUSCH from the PUSCHs that overlap with the PUCCH in the time domain according to a specified method. The UE multiplexes HARQ-ACK in the determined PUSCH. For example, the UE can determine one PUSCH from the PUSCHs that overlap with the PUCCH in the time domain according to the method specified in 3GPP TS 38.213. If the DCI which schedules the PUSCH indicates $V_{T\text{-}DAI}^{UL}=0$, the UE transmits the PUCCH, and the UE does not transmit the PUSCH that overlaps with the PUCCH in the time domain. Alternatively, the UE simultaneously transmits the PUCCH and the PUSCH that overlaps with the PUCCH in the time domain. Alternatively, the UE ignores the indication of the UL DAI field, and the UE multiplexes the HARQ-ACK information in the PUSCH for transmission.

Approach 2: the UE determines the PUSCH that the scheduling DCI indicates $V_{T\text{-}DAI}^{UL}=1$ from the PUSCHs that overlap with the PUCCH in the time domain, and denote a set consisting of the determined PUSCHs as B0. If set B0 is not empty, the UE determines one PUSCH from the set B0. The UE determines one PUSCH from the set B0 according to a specified method. For example, the UE can determine one PUSCH from the set B0 according to the method specified in 3GPP TS 38.213. The UE multiplexes HARQ-ACK in the determined PUSCH. The UE does not multiplex HARQ-ACK information in other PUSCHs in the set B0. Alternatively, if the set B0 is not empty, the UE can multiplex HARQ-ACK in all PUSCHs in set B0.

If the set B0 is empty, the UE determines the PUSCHs that the scheduling DCI does not indicate UL DAI field and the PUSCHs without scheduling DCI from the PUSCHs that overlap with the PUCCH in the time domain, and denotes a set consist of the PUSCHs as B1. If the set B1 is not empty, the UE determines one PUSCH from the set B1. The UE determines one PUSCH from the set B1 according to a specified method. For example, the UE can determine one PUSCH from the set B1 according to the method specified in 3GPP TS 38.213. The UE multiplexes HARQ-ACK in the determined PUSCH. The UE does not multiplex HARQ-ACK information in other PUSCHs in the set B0.

If the set B0 is empty and the set B1 is empty, the UE transmits the PUCCH, and the UE does not transmit the PUSCH that overlaps with the PUCCH in the time domain. Alternatively, the UE determines one PUSCH from the PUSCHs that overlap with the PUCCH in the time domain according to a specified method. For example, the UE can determine one PUSCH from the PUSCHs that overlap with the PUCCH in the time domain according to the method specified in 3GPP TS 38.213, and multiplex HARQ-ACK in the PUSCH, and the UE ignores the indication of the UL DAI field. Alternatively, the UE simultaneously transmits the PUCCH and the PUSCH that overlaps with the PUCCH in the time domain.

Approach 3: the UE determines the PUSCHs that the scheduling DCI indicates $V_{T\text{-}DAI}^{UL}=1$ from the PUSCHs that overlap with the PUCCH in the time domain, the PUSCHs that the scheduling DCI does not indicate UL DAI field, and the PUSCHs without scheduling DCI, and denotes a set consisting of these PUSCHs as B2. If the set B2 is not empty, the UE determines one PUSCH from the set B2 according to a specified method. For example, the UE can determine one PUSCH from the set B2 according to the method specified in 3GPP TS 38.213. The UE multiplexes HARQ-ACK in the determined PUSCH. The UE does not multiplex HARQ-ACK information in other PUSCHs in the set B2.

If the set B2 is empty, the UE transmits the PUCCH, and the UE does not transmit the PUSCH that overlaps with the PUCCH in the time domain. Alternatively, the UE determines one PUSCH from the PUSCHs that overlap with the PUCCH in the time domain according to a specified method, and multiplexes the HARQ-ACK in the PUSCH, and ignores the indication of the UL DAI field. For example, the UE can determine one PUSCH from the PUSCHs that overlap the PUCCH in the time domain according to the method specified in 3GPP TS 38.213.

It should be noted that if the PUCCH includes CSI, the CSI can be processed in the same manner as HARQ-ACK.

It should be noted that when a PUCCH at a PUCCH time unit does not overlap with a PUSCH in the time domain, and at least a part of the PUSCH overlaps with the PUCCH time unit, the base station can indicate the UL DAI indicating $V_{T\text{-}DAI}^{UL}=1$ by indicating the scheduling DCI scheduling of the PUSCH. At that time, the UE can multiplex the HARQ-ACK and/or CSI in the PUCCH in the PUSCH. The sets B0 and B2 can also include the PUSCH.

It should be noted that for all PUSCHs for which the UL DAI indicates $V_{T\text{-}DAI}^{UL}=1$, the UE multiplexes HARQ-ACK information in all these PUSCHs, and the UE can determine the size of the HARQ-ACK codebook and generate the HARQ-ACK code according to the higher-layer signaling configuration. For example, the UE can generate the HARQ-ACK codebook according to 3GPP TS 38.213 9.1.2.1. If the UE does not detect the PDSCH or DCI that needs to feed back the HARQ-ACK, the bits of HARQ-ACK are all NACK.

It should be noted that if a PUSCH for which UL DAI indicates $V_{T\text{-}DAI}^{UL}=1$ and multiple PUCCH time units overlap in time, the UE determines one PUCCH carrying HARQ-ACK from the PUCCH time units that satisfy the multiplexing timing relationship. If all PUCCH time units that satisfy the multiplexing timing relationship do not include HARQ-ACK information, the UE determines the first PUCCH time unit or the last PUCCH time unit, and the UE can determine the size of the HARQ-ACK codebook and determine the HARQ-ACK codebook according to the higher-layer signaling configuration. For example, the UE can generate a HARQ-ACK codebook according to 3GPP TS 38.213 9.1.2.1, and the bits of HARQ-ACK are all NACK.

This method clarifies the behavior of the UE and improves the reliability of uplink control signaling and data transmission. It increases the transmission probability of uplink data, improves the spectrum efficiency, and improves the fault tolerance rate of the network. It can also reduce the number of blind detection on the network and reduce the user plane delay.

Figure 3:
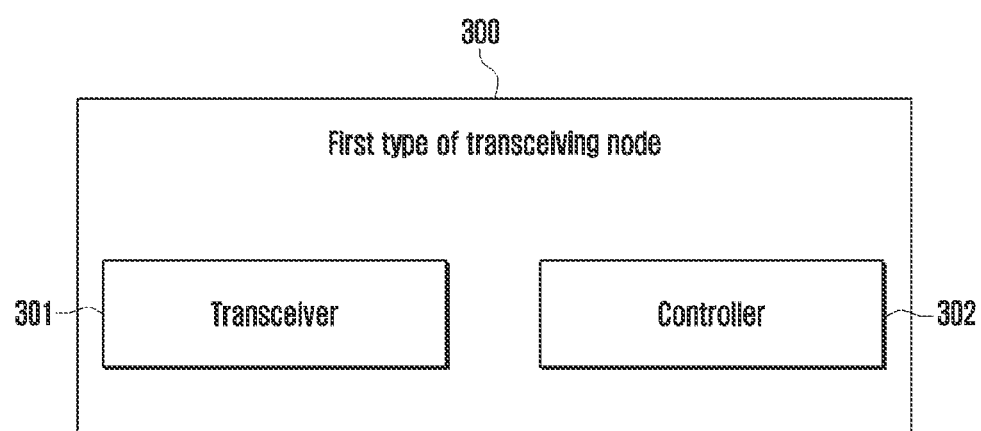
FIG. 3 illustrates a block diagram of a first type of transceiving node according to an embodiment.

FIG. 3 illustrates a block diagram of a first type of transceiving node according to an embodiment. This first type of transceiving node can implement various methods and/or algorithms implemented by the first type of transceiving node herein, but it does not imply a physical or structural restriction on the ways in which different embodiments can be implemented. Rather, the different embodiments of the present disclosure can be implemented in any suitably arranged system.

Referring to FIG. 3, a first type of transceiving node 300 may include a transceiver 301 and a controller 302.

The transceiver 301 may be configured to transmit first type of data and/or first type of control signaling to a second type of transceiving node and receive second type of data and/or second type of control signaling from the second type of transceiving node in a time unit.

The controller 302 may be an application specific integrated circuit or at least one processor. The controller 302 may be configured to control the overall operation of the first type of transceiving node, including controlling the transceiver 301 to transmit the first type of data and/or the first type of control signaling to the second type of transceiving node and receive the second type of data and/or the second type of control signaling from the second type of transceiving node in a determined time unit, where this second type of data and/or second type of control signaling and the time unit are determined by the second type of transceiving node based on received first type of data and/or first type of control signaling.

In the following description, a base station is taken as an example (but not limited thereto) to illustrate the first type of transceiving node, a UE is taken as an example (but not limited thereto) to illustrate the second type of transceiving node, a downlink time unit (but not limited thereto) is used to illustrate a first type of time unit, and a uplink time unit (but not limited thereto) is used to illustrate the time unit. Downlink data and/or downlink control signaling (but not limited thereto) are used to illustrate the first type of data and/or the first type of control signaling. A HARQ-ACK codebook may be included in the second type of control signaling, and uplink control signaling (but not limited thereto) is used to illustrate the second type of control signaling.

Figure 4:
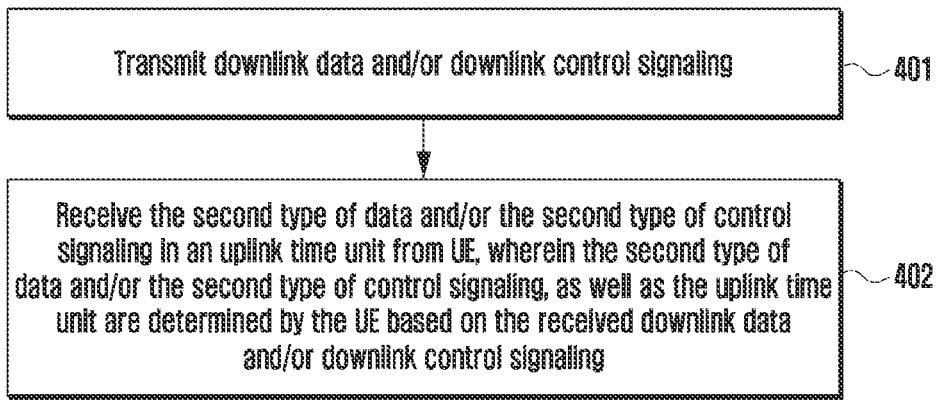
FIG. 4 is a flowchart of a method performed by a base station according to an embodiment.

FIG. 4 illustrates a flowchart of a method performed by a base station according to an embodiment.

In step 401, the base station transmits downlink data and/or downlink control signaling to a UE.

In step 402, the base station receives second type of data and/or second type of control signaling from the UE in an uplink time unit, where the second type of data and/or the second type of control signaling and the uplink time unit are determined by the UE based on received downlink data and/or downlink control signaling.

Those skilled in the art will understand that the base station may decode the second type of data and/or the second type of control signaling based on a method corresponding to the method performed by the UE in the above embodiments.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the present disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a digital signal processor (DSP), an application specific integrated circuit (ASIC), a field programmable gate array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the methods or algorithms described in this disclosure may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more designs described herein, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

The embodiments described herein are only for easy description and help to comprehensively understand this disclosure, and are not intended to limit the scope of this disclosure. Therefore, it should be understood that, in addition to the embodiments disclosed herein, all modifications and changes or forms of modifications and changes derived from the technical idea described herein fall within the scope of this disclosure.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method performed by a terminal in a wireless communication system, the method comprising:
   multiplexing first hybrid automatic repeat request-acknowledgement (HARQ-ACK) information bits and second HARQ-ACK information bits of different priorities in a physical uplink control channel (PUCCH);
   determining a power for the PUCCH, assuming that the PUCCH includes only uplink control information (UCI) bits of a higher priority of the different priorities; and
   transmitting, to a base station, the PUCCH based on the determined power for the PUCCH.

2. The method of claim 1, wherein the PUCCH is transmitted using a PUCCH resource that includes a PUCCH format 2, a PUCCH format 3, or a PUCCH format 4.

3. The method of claim 1, further comprising receiving, from the base station, configuration information on a PUCCH configuration list including PUCCH configurations corresponding to the different priorities.

4. The method of claim 1, further comprising receiving, from the base station, a physical downlink control channel (PDCCH),
   wherein the PDCCH carries downlink control information (DCI) indicating one of the different priorities.

5. The method of claim 4, further comprising transmitting, to the base station, capability information of the terminal indicating a capability to monitor, in an active downlink bandwidth part, the PDCCH for detection of the DCI.

6. A method performed by a base station in a wireless communication system, the method comprising:
   receiving, from a terminal, a physical uplink control channel (PUCCH) in which first hybrid automatic repeat request-acknowledgement (HARQ-ACK) information bits and second HARQ-ACK information bits of different priorities are multiplexed,
   wherein a transmit power for the PUCCH is determined by assuming that the PUCCH includes only uplink control information (UCI) bits of a higher priority of the different priorities.

7. The method of claim 6, wherein the PUCCH is received according to a PUCCH resource that includes a PUCCH format 2, a PUCCH format 3, or a PUCCH format 4.

8. The method of claim 6, further comprising transmitting, to the terminal, configuration information on a PUCCH configuration list including PUCCH configurations corresponding to the different priorities.

9. The method of claim 6, further comprising transmitting, to the terminal, a physical downlink control channel (PDCCH),
   wherein the PDCCH carries downlink control information (DCI) indicating one of the different priorities.

10. The method of claim 9, further comprising receiving, from the terminal, capability information of the terminal indicating a capability to monitor, in an active downlink bandwidth part, the PDCCH for detection of the DCI.

11. A terminal in a wireless communication system, the terminal comprising:
    a transceiver; and
    a controller configured to:
        multiplex first hybrid automatic repeat request-acknowledgement (HARQ-ACK) information bits and second HARQ-ACK information bits of different priorities in a physical uplink control channel (PUCCH),
        determine a power for the PUCCH assuming that the PUCCH includes only uplink control information (UCI) bits of a higher priority of the different priorities, and
        transmit, to a base station, via the transceiver, the PUCCH based on the determined power for the PUCCH.

12. The terminal of claim 11, wherein the PUCCH is transmitted using a PUCCH resource that includes a PUCCH format 2, a PUCCH format 3, or a PUCCH format 4.

13. The terminal of claim 11, wherein the controller is further configured to receive, from the base station via the transceiver, configuration information on a PUCCH configuration list including PUCCH configurations corresponding to the different priorities.

14. The terminal of claim 11, wherein the controller is further configured to receive, from the base station via the transceiver, a physical downlink control channel (PDCCH), and
    wherein the PDCCH carries downlink control information (DCI) indicating one of the different priorities.

15. The terminal of claim 14, wherein the controller is further configured to transmit, to the base station, via the transceiver, capability information of the terminal indicating a capability to monitor, in an active downlink bandwidth part, the PDCCH for detection of the DCI.

16. A base station in a wireless communication system, the base station comprising:
    a transceiver; and
    a controller configured to:
        receive, from a terminal, via the transceiver, a physical uplink control channel (PUCCH) in which first hybrid automatic repeat request-acknowledgement (HARQ-ACK) information bits and second HARQ-ACK information bits of different priorities are multiplexed,
    wherein a transmit power for the PUCCH is determined by assuming that the PUCCH includes only uplink control information (UCI) bits of a higher priority of the different priorities.

17. The base station of claim 16, wherein the PUCCH is received according to a PUCCH resource that includes a PUCCH format 2, a PUCCH format 3, or a PUCCH format 4.

18. The base station of claim 16, wherein the controller is further configured to transmit, to the terminal via the transceiver, configuration information on a PUCCH configuration list including PUCCH configurations corresponding to the different priorities.

19. The base station of claim 16, wherein the controller is further configured to transmit, to the terminal, via the transceiver, a physical downlink control channel (PDCCH), and wherein the at least one PDCCH carries downlink control information (DCI)—indicating one of the different priorities.

20. The base station of claim 19, wherein the controller is further configured to receive, from the terminal, via the transceiver, capability information of the terminal indicating a capability to monitor, in an active downlink bandwidth part, the PDCCH for detection of the DCI.

* * * * *